United States Patent
Rosa et al.

(10) Patent No.: US 12,028,907 B2
(45) Date of Patent: Jul. 2, 2024

(54) RACH-BASED TX BEAM REFINEMENT PROCEDURE

(71) Applicant: Nokia Technologies Oy, Espoo (FI)

(72) Inventors: Claudio Rosa, Randers NV (DK); Renato Abreu, Aalborg (DK); Daniela Laselva, Klarup (DK); Nuno Pratas, Gistrup (DK); Benny Vejlgaard, Gistrup (DK); Simon Svendsen, Aalborg (DK); Oana-Elena Barbu, Aalborg (DK); Marco Centenaro, Aalborg (DK); Emad Farag, Flanders, NJ (US)

(73) Assignee: NOKIA TECHNOLOGIES OY, Espoo (FI)

( * ) Notice: Subject to any disclaimer, the term of this patent is extended or adjusted under 35 U.S.C. 154(b) by 407 days.

(21) Appl. No.: 17/594,845

(22) PCT Filed: May 3, 2019

(86) PCT No.: PCT/US2019/030743
§ 371 (c)(1),
(2) Date: Nov. 1, 2021

(87) PCT Pub. No.: WO2020/226611
PCT Pub. Date: Nov. 12, 2020

(65) Prior Publication Data
US 2022/0295570 A1   Sep. 15, 2022

(51) Int. Cl.
*H04W 74/0836*   (2024.01)
*H04W 16/28*   (2009.01)
(Continued)

(52) U.S. Cl.
CPC ....... *H04W 74/0836* (2024.01); *H04W 16/28* (2013.01); *H04W 56/001* (2013.01); *H04W 74/0841* (2013.01); *H04W 74/0866* (2013.01)

(58) Field of Classification Search
CPC ................................. H04W 74/0836
See application file for complete search history.

(56) References Cited

U.S. PATENT DOCUMENTS

2015/0003343 A1\* 1/2015 Li ................ H04B 7/0617
370/329
2017/0367120 A1\* 12/2017 Murray ............... H04B 7/0695
(Continued)

OTHER PUBLICATIONS

"New work item: 2-step RACH for NR", 3GPP TSG RAN Meeting #82, RP-182894, Agenda: 9.1.1, ZTE Corporation, Dec. 10-13, 2018, 5 pages.
(Continued)

*Primary Examiner* — Jason E Mattis
(74) *Attorney, Agent, or Firm* — Robert P. Michal, Esq.; Carter, DeLuca & Farrell LLP

(57) ABSTRACT

In accordance with some example embodiments, an apparatus may comprise at least one processor and at least one memory including computer program code, wherein the at least one memory and the computer program code are configured to, with the at least one processor, cause the apparatus to transmit at least one parameter configuration of a random access channel procedure to a user equipment; receive at least one physical uplink shared channel part of a first random access channel message using at least one transmitter beam configuration; upon detection of at least one preamble part of the first random access channel message, decode the physical uplink shared channel part of the first random access channel message and perform at least one channel quality measurement on at least one demodulation reference signal sequence transmitted on a number of selected transmitter beam configurations.

19 Claims, 26 Drawing Sheets

(51) Int. Cl.
*H04W 56/00* (2009.01)
*H04W 74/08* (2009.01)
*H04W 74/0833* (2024.01)

(56) References Cited

U.S. PATENT DOCUMENTS

| | | | | |
|---|---|---|---|---|
| 2018/0176958 | A1 | 6/2018 | Islam et al. | |
| 2019/0281635 | A1* | 9/2019 | Kwak | H04L 5/0048 |
| 2019/0306888 | A1* | 10/2019 | Takeda | H04W 74/0833 |
| 2019/0379431 | A1* | 12/2019 | Park | H04B 7/0408 |
| 2020/0015273 | A1* | 1/2020 | Zhang | H04B 7/088 |
| 2020/0112993 | A1* | 4/2020 | Tsai | H04W 72/046 |

OTHER PUBLICATIONS

"IEEE Standard for Information technology—Telecommunications and information exchange between systems—Local and metropolitan area networks—Specific requirements-Part 11: Wireless LAN Medium Access Control (MAC) and Physical Layer (PHY) Specifications Amendment 3: Enhancements for Very High Throughput in the 60 GHz Band", IEEE Computer Society, IEEE Std 802.11ad™, Dec. 28, 2012, 628 pages.

"3rd Generation Partnership Project; Technical Specification Group Radio Access Network; NR; Physical channels and modulation (Release 15)", 3GPP TS 38.211, V15.5.0, Mar. 2019, pp. 1-96.

"3rd Generation Partnership Project; Technical Specification Group Radio Access Network; NR; Medium Access Control (MAC) protocol specification (Release 15)", 3GPP TS 38.321, V15.5.0, Mar. 2019, pp. 1-78.

"3rd Generation Partnership Project; Technical Specification Group Radio Access Network; NR; Radio Resource Control (RRC) protocol specification (Release 15)", 3GPP TS 38.331, V15.5.1, Apr. 2019, pp. 1-491.

International Search Report and Written Opinion received for corresponding Patent Cooperation Treaty Application No. PCT/US2019/030743, dated Dec. 11, 2019, 20 pages.

"Discussions on 2 Steps RACH Procedure", 3GPP TSG RAN WG2 Meeting AH_NR Meeting, R2-1700471, Agenda: 3.2.1.4, Sony, Jan. 17-19, 2017, 5 pages.

"Channel structure for two-step RACH", 3GPP TSG RAN WG1 #96, R1-1902466, Agenda: 7.2.1.1, Intel Corporation, Feb. 25-Mar. 1, 2019, pp. 1-8.

\* cited by examiner (a)

RACH-BASED TX BEAM REFINEMENT PROCEDURE

RELATED APPLICATION

This application claims priority to PCT Application No. PCT/US2019/030743, filed on May 3, 2019 the contents of which is incorporated herein by reference in its entirety.

BACKGROUND

Field

Certain example embodiments may relate to communication systems. For example, some example embodiments may relate to beamforming.

Description of the Related Art

3rd Generation Partnership Project (3GPP) Release (Rel)-15 specifications provides support for beamforming, as well as downlink common control channels. However, due to the large number of reception (Rx) and transmission (Tx) antennas required to perform beamforming, support of Rx/Tx beamforming in terminal devices is only provided for a subset of the frequency ranges available for operation of new radio (NR). Specifically, Rx/Tx beamforming in terminal devices may only be available at the newly-added frequency ranges of FR2 (up to 52.6 GHz) and beyond 52.6 GHz. At these frequency ranges, beamforming may be primarily used to compensate for the increased free space loss. While FR2 is already supported by Rel-15, 3GPP is expected to support operation in frequencies above 52.6 GHz in future releases.

SUMMARY

In accordance with some example embodiments, a method may include transmitting, by a network entity, at least one parameter configuration of a random access channel procedure to a user equipment. The method may further include receiving, by a network entity, at least one physical uplink shared channel part of a first random access channel message using at least one transmitter beam configuration. The method may further include upon detection of at least one preamble part of the first random access channel message, decoding, by the network entity, the physical uplink shared channel part of the first random access channel message and performing at least one channel quality measurement on at least one demodulation reference signal sequence transmitted on a number of selected transmitter beam configurations.

In accordance with some example embodiments, an apparatus may include means for transmitting at least one parameter configuration of a random access channel procedure to a user equipment. The apparatus may further include means for receiving at least one physical uplink shared channel part of a first random access channel message using at least one transmitter beam configuration. The apparatus may further include means for upon detection of at least one preamble part of the first random access channel message, decoding the physical uplink shared channel part of the first random access channel message and perform at least one channel quality measurement on at least one demodulation reference signal sequence transmitted on a number of selected transmitter beam configurations.

In accordance with some example embodiments, an apparatus may include at least one processor and at least one memory including computer program code. The at least one memory and the computer program code can be configured to, with the at least one processor, cause the apparatus to at least transmit at least one parameter configuration of a random access channel procedure to a user equipment. The at least one memory and the computer program code can be further configured to, with the at least one processor, cause the apparatus to at least receive at least one physical uplink shared channel part of a first random access channel message using at least one transmitter beam configuration. The at least one memory and the computer program code can be further configured to, with the at least one processor, cause the apparatus to at least upon detection of at least one preamble part of the first random access channel message, decode the physical uplink shared channel part of the first random access channel message and perform at least one channel quality measurement on at least one demodulation reference signal sequence transmitted on a number of selected transmitter beam configurations.

In accordance with some example embodiments, a non-transitory computer readable medium can be encoded with instructions that may, when executed in hardware, perform a method. The method may include transmitting at least one parameter configuration of a random access channel procedure to a user equipment. The method may further include receiving at least one physical uplink shared channel part of a first random access channel message using at least one transmitter beam configuration. The method may further include upon detection of at least one preamble part of the first random access channel message, decoding the physical uplink shared channel part of the first random access channel message and perform at least one channel quality measurement on at least one demodulation reference signal sequence transmitted on a number of selected transmitter beam configurations.

In accordance with some example embodiments, a computer program product may perform a method. The method may include transmitting, by a network entity, at least one parameter configuration of a random access channel procedure to a user equipment. The method may further include receiving, by a network entity, at least one physical uplink shared channel part of a first random access channel message using at least one transmitter beam configuration. The method may further include, upon detection of at least one preamble part of the first random access channel message, decoding, by the network entity, the physical uplink shared channel part of the first random access channel message and performing at least one channel quality measurement on at least one demodulation reference signal sequence transmitted on a number of selected transmitter beam configurations.

In accordance with some example embodiments, an apparatus may include circuitry configured to transmit at least one parameter configuration of a random access channel procedure to a user equipment. The circuitry may further receive at least one physical uplink shared channel part of a first random access channel message using at least one transmitter beam configuration. The circuitry may further, upon detection of at least one preamble part of the first random access channel message, decode the physical uplink shared channel part of the first random access channel message and perform at least one channel quality measurement on at least one demodulation reference signal sequence transmitted on a number of selected transmitter beam configurations.

In accordance with some example embodiments, a method may include receiving, by a user equipment, at least one procedure parameter configuration or a random access channel from a network entity. The method may further include selecting, by the user equipment, at least one beam configuration for the transmission of the preamble part and/or the physical uplink shared channel part of a first random access channel message. The method may further include performing, by the user equipment, beam sweeping by transmitting at least one physical uplink shared channel part of a first random access channel message using at least one transmitter beam.

In accordance with some example embodiments, an apparatus may include means for receiving at least one procedure parameter configuration or a random access channel from a network entity. The apparatus may further include means for selecting at least one beam configuration for the transmission of the preamble part and/or the physical uplink shared channel part of a first random access channel message. The apparatus may further include means for performing beam sweeping by transmitting at least one physical uplink shared channel part of a first random access channel message using at least one transmitter beam.

In accordance with some example embodiments, an apparatus may include at least one processor and at least one memory including computer program code. The at least one memory and the computer program code can be configured to, with the at least one processor, cause the apparatus to at least receive at least one 2-step RACH procedure parameter configuration from a network entity. The at least one memory and the computer program code can be further configured to, with the at least one processor, cause the apparatus to at least select at least one beam configuration for the transmission of the preamble part and/or the physical uplink shared channel part of a first random access channel message. The at least one memory and the computer program code can be further configured to, with the at least one processor, cause the apparatus to at least perform beam sweeping by transmitting at least one physical uplink shared channel part of a first random access channel message using at least one transmitter beam.

In accordance with some example embodiments, a non-transitory computer readable medium can be encoded with instructions that may, when executed in hardware, perform a method. The method may include receiving at least one procedure parameter configuration or a random access channel from a network entity. The method may further include selecting at least one beam configuration for the transmission of the preamble part and/or the physical uplink shared channel part of a first random access channel message. The method may further include perform beam sweeping by transmitting at least one physical uplink shared channel part of a first random access channel message using at least one transmitter beam.

In accordance with some example embodiments, a computer program product may perform a method. The method may include receiving at least one procedure parameter configuration or a random access channel from a network entity. The method may further include selecting at least one beam configuration for the transmission of the preamble part and/or the physical uplink shared channel part of a first random access channel message. The method may further include perform beam sweeping by transmitting at least one physical uplink shared channel part of a first random access channel message using at least one transmitter beam.

In accordance with some example embodiments, an apparatus may include circuitry configured to receive at least one procedure parameter configuration or a random access channel from a network entity. The circuitry may further select at least one beam configuration for the transmission of the preamble part and/or the physical uplink shared channel part of a first random access channel message. The circuitry may further perform beam sweeping by transmitting at least one physical uplink shared channel part of a first random access channel message using at least one transmitter beam.

BRIEF DESCRIPTION OF THE DRAWINGS

For proper understanding of this disclosure, reference should be made to the accompanying drawings, wherein.

DETAILED DESCRIPTION

Figure 1:
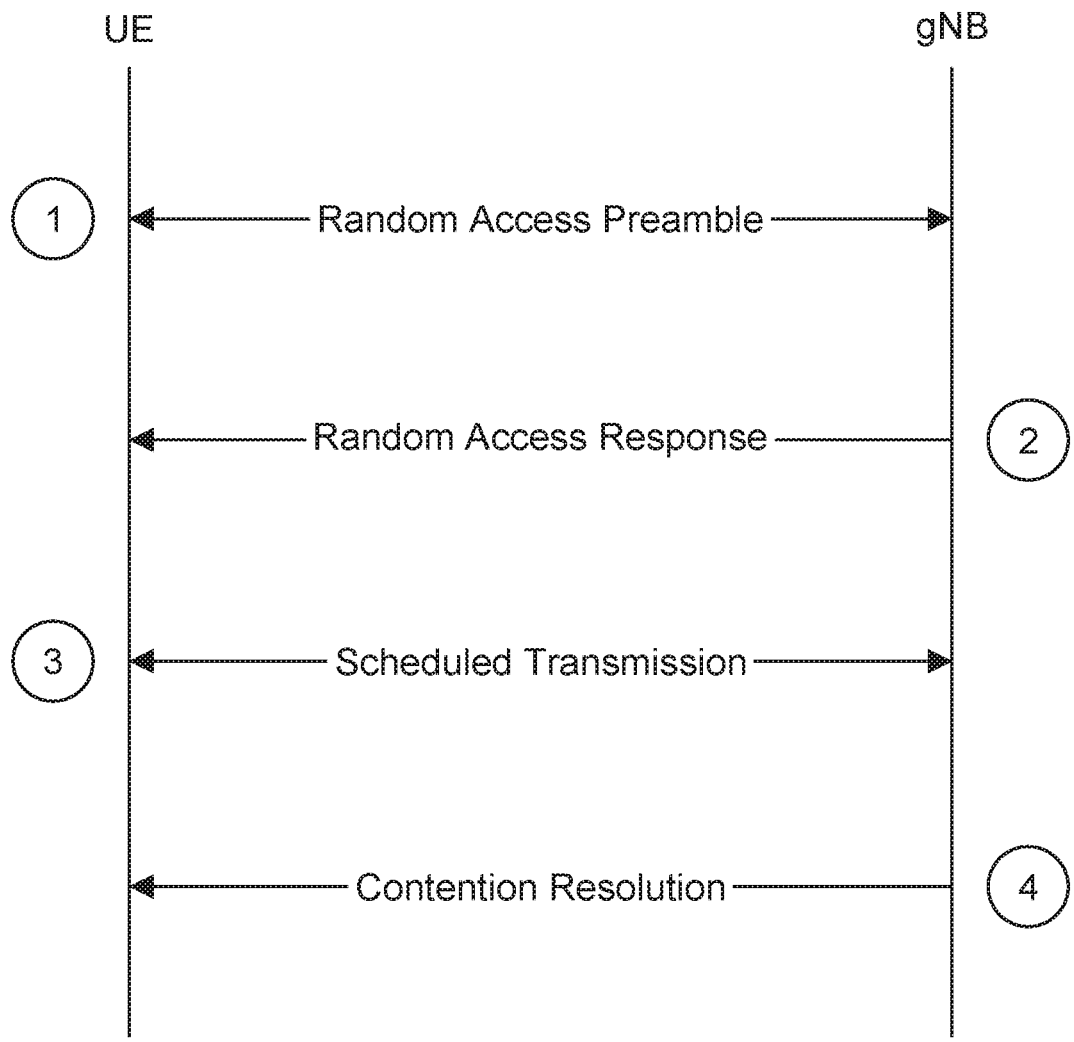
FIG. 1 illustrates an example of a 4-step RACH procedure according to certain example embodiments.
Figure 2:
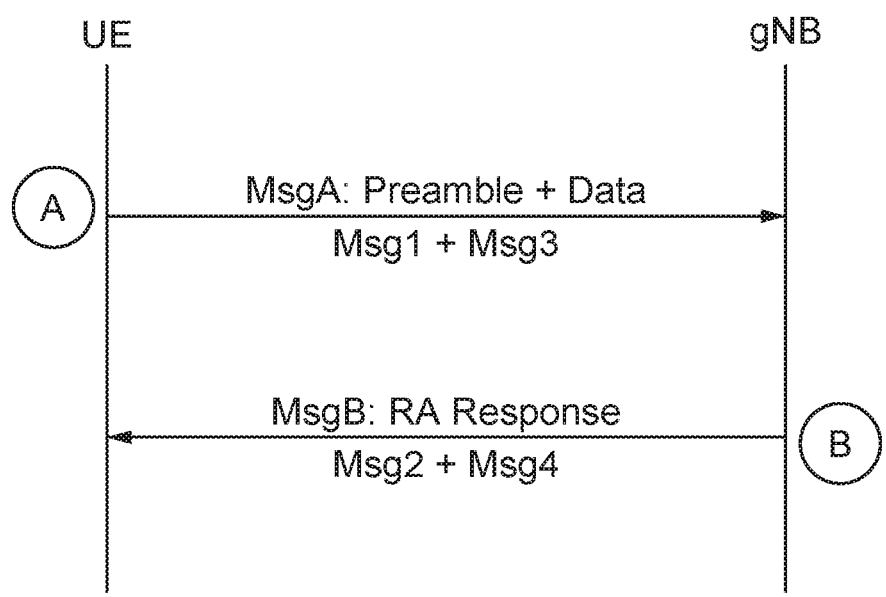
FIG. 2 illustrates an example of a 2-step RACH procedure according to certain example embodiments.

FIG. 1 illustrates the legacy 4-step random access procedure (RACH) procedure, which is supported by 3GPP Rel-15 NR. In contrast, in the 2-step RACH procedure, illustrated in FIG. 2, msgA is a combination of the preamble signal transmitted on the physical random access channel (PRACH) (msg1) with the data signal transmitted on the physical uplink shared channel. In addition, msgB combines the random access response (RAR) (msg2) with the contention resolution (msg4) of the legacy 4-step RACH procedure.

3GPP RP-182894 is intended to examine the 2-step RACH procedure, in particular, the channel structure for msgA, including the mapping between the PRACH preamble and the time-frequency resources of PUSCH in msgA and demodulation reference signal (DMRS). In particular, the channel structure of msgA may be a preamble and PUSCH-carrying payload, such as RANI. The Rel-15 PRACH preamble may be reused, as well as the PUSCH including Rel-15 DMRS for transmission of msgA payload. However, this may only prevent the introduction of new DMRS sequences to support operations with advanced receivers at the base station, while modifications and enhancements to the 4-way legacy DMRS sequences may be mapped to the time-frequency resources of PUSCH in msgA may still be permitted.

Figure 3:
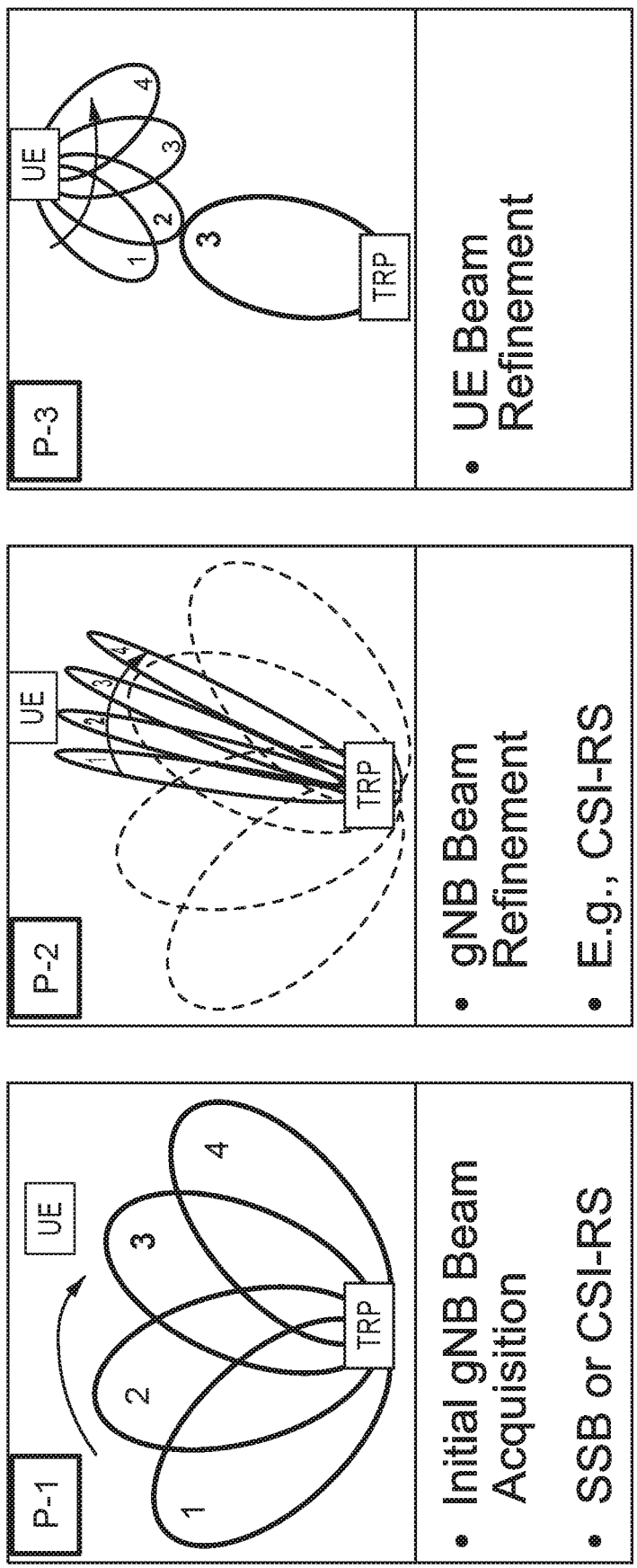
FIG. 3 illustrates an example of a beam alignment procedure specified for 5G NR for FR2.

The usage of these higher frequency ranges may be enabled by communication with highly directional beams at both the base station and at the user equipment (UE), which may compensate for large free space loss. Beamforming capabilities at the terminal device may require training of the Tx beams at the UE. As the carrier frequency of the communication increases and the Tx beams becomes narrower, the number of possible beams to be trained also significantly increases. FIG. 3 illustrates the Rx/Tx beam alignment procedure between the base station and the UE, beginning with the base station transmitting at least one probe signal in different directions using different Tx beams, as illustrated in P-1. The UE may then provide feedback on the best base station beam, shown at P-2. The UE which transmits the probe signal in different direction may use different Tx beam configurations, shown at P-2 and P-3. Finally, the base station provides feedback on the best UE beam, occurring at P-2 and P-3.

Phases P-2 and P-3 require further signaling exchanges outside of the 2-step and 4-step RACH procedure. In addition, this procedure may be reiterated several times to increase the accuracy of the Rx/Tx between the base station and the UE. However, with vary narrow beams and a large degree of freedom in the spatial domain, the Rx/Tx beam alignment procedure may be expensive, in terms of both overhead and latency. This is due to requiring the transmission of probe signal in multiple directions at both ends of the communication link.

Institute of Electrical and Electronics Engineers (IEEE) standard 802.11 ad/ay discusses two steps: a sector level sweep (SLS) and a beam refinement phase (BRP). The SLS procedure for Rx/Tx beam training performed in the beacon header interval. The procedure may be repeated periodically for all connected terminals, and as such, represents a constant overhead. During the SLS procedure, an initiator, such as access point (AP), may transmits at least one sector sweep (SSW) frame across up to 128 sectors. Each SSW frame has its own identification. Responders, such as a mobile stations (STA), may listen in a quasi-omni directional mode. Each responder may transmit its SSW frames using random backoffs. SSW frames transmitted by the responders may contain the ID of the initiator's optimal sector/beam. The initiator may then send SSW feedback frames with the responder's best ID.

Following the SLS procedure, the initiator and the responders may go through a BRP for fine retuning of the beams. The BRP procedure is similar to the SLS procedure, with the initiator transmitting a training sequence in the identified Rx direction. The responder also transmits a training sequence in the identified Rx direction, including feedback related to the initiator's training sequence. Finally, the initiator responds with feedback on the responder's training sequence.

However, the 802.11 ad/ay standard requires transmission of probe signals in many directions at both ends of the communication link, before communications between the AP and the STA begin. In addition, the UE waits to perform Tx beam training procedure until it has entered a RRC connected mode. This is the assumption in Rel-15 NR, which supports a coarse training of the gNB Tx beams during the RACH procedure by the UE indicating the best received synchronization signal block (SSB) via preamble selection. However, for training of the UE Tx beams, it is required that the UE enters RRC connected mode to be allocated specific uplink reference signals.

Figure 4:
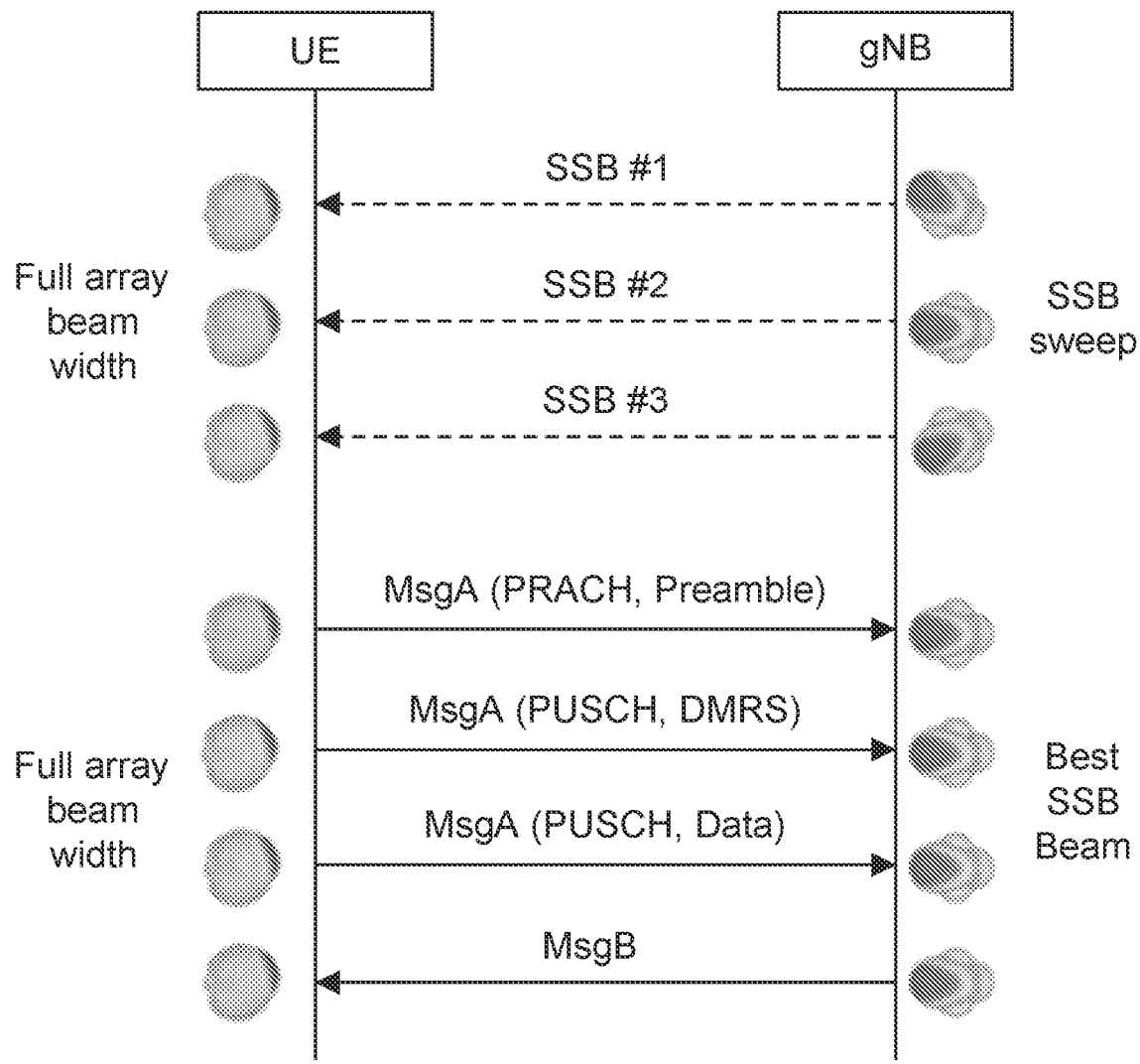
FIG. 4 illustrates an example of initial access and a 2-step RACH procedure.

With initial beam selection in NR Rel-15, the UE may determine the wider beam according to the identified direction of arrival (DoA) of the strongest SSB beam from the gNB, and transmit MsgA in the corresponding direction (phase P-1 illustrated in FIG. 3). The UE Tx beam refinement procedure is then left for subsequent communication between UE and gNB, requiring additional signaling and associated latency. In the 2-step RACH, the first beam alignment phase (P-1) is currently described in R-15 in the context of 4-step RACH, as illustrated in FIG. 4.

Certain example embodiments described herein may have various benefits and/or advantages. For example, some example embodiments may include a UE providing beam sweeping information as part of the RAP, including at least N best UE Tx refined beams within the strongest SSB beam that is selected for the transmission of the preamble. In this manner, Tx beam refinement may be performed faster and with fewer resources. Furthermore, this 2-step RACH procedure may reduce latency and overall signaling overhead. Some embodiments may also reduce the delay of the Tx beam refinement procedure. Thus, certain example embodiments are directed to improvements in computer-related technology, specifically, by conserving network resources and reducing power consumption of network entities and/or user equipment located within the network.

Figure 5:
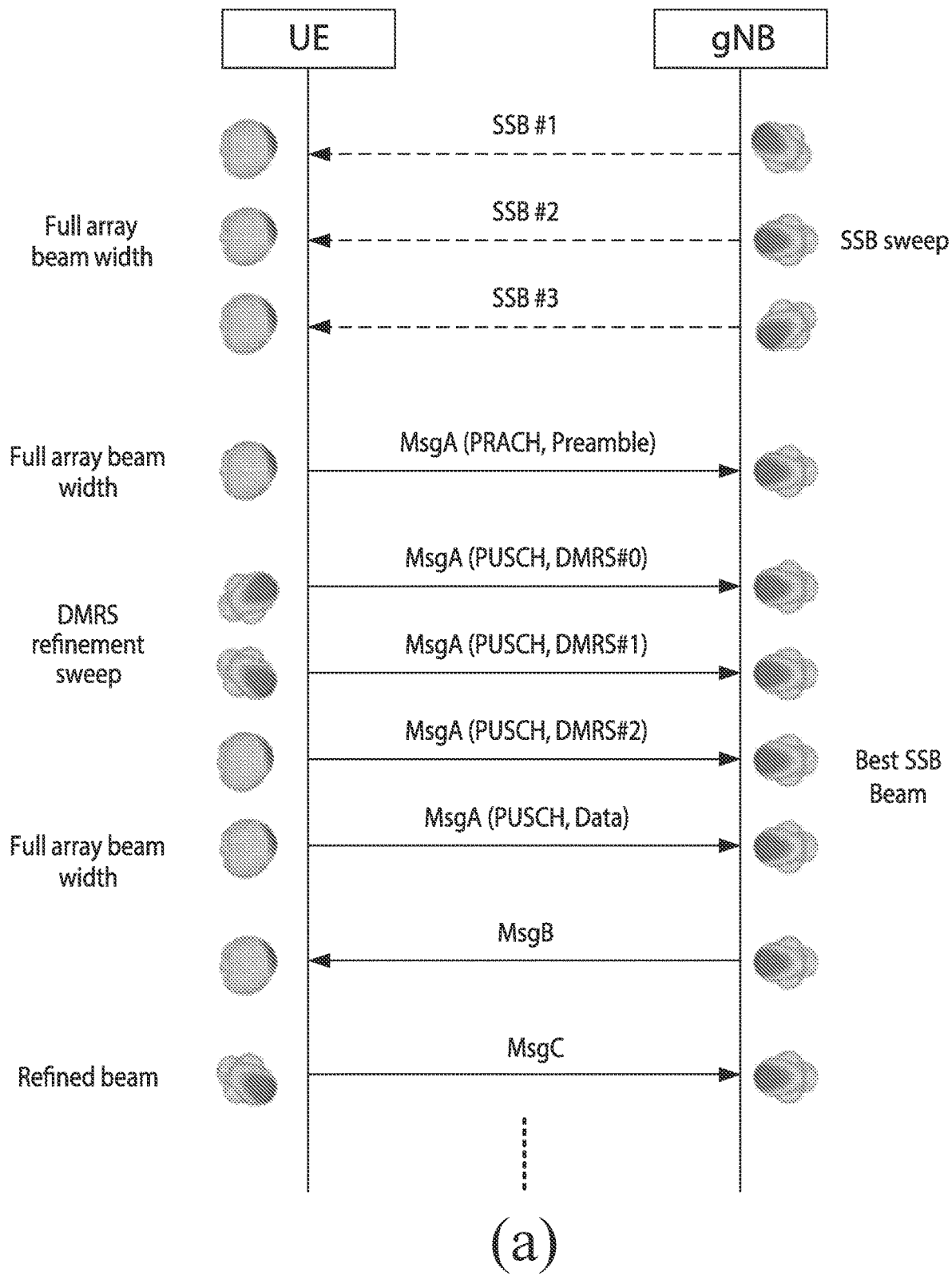
FIGS. 5a, 5b, 5c, 5d and 5e illustrate a UE using a narrow high gain beam for MsgA preamble according to certain example embodiments.
Figure 5:
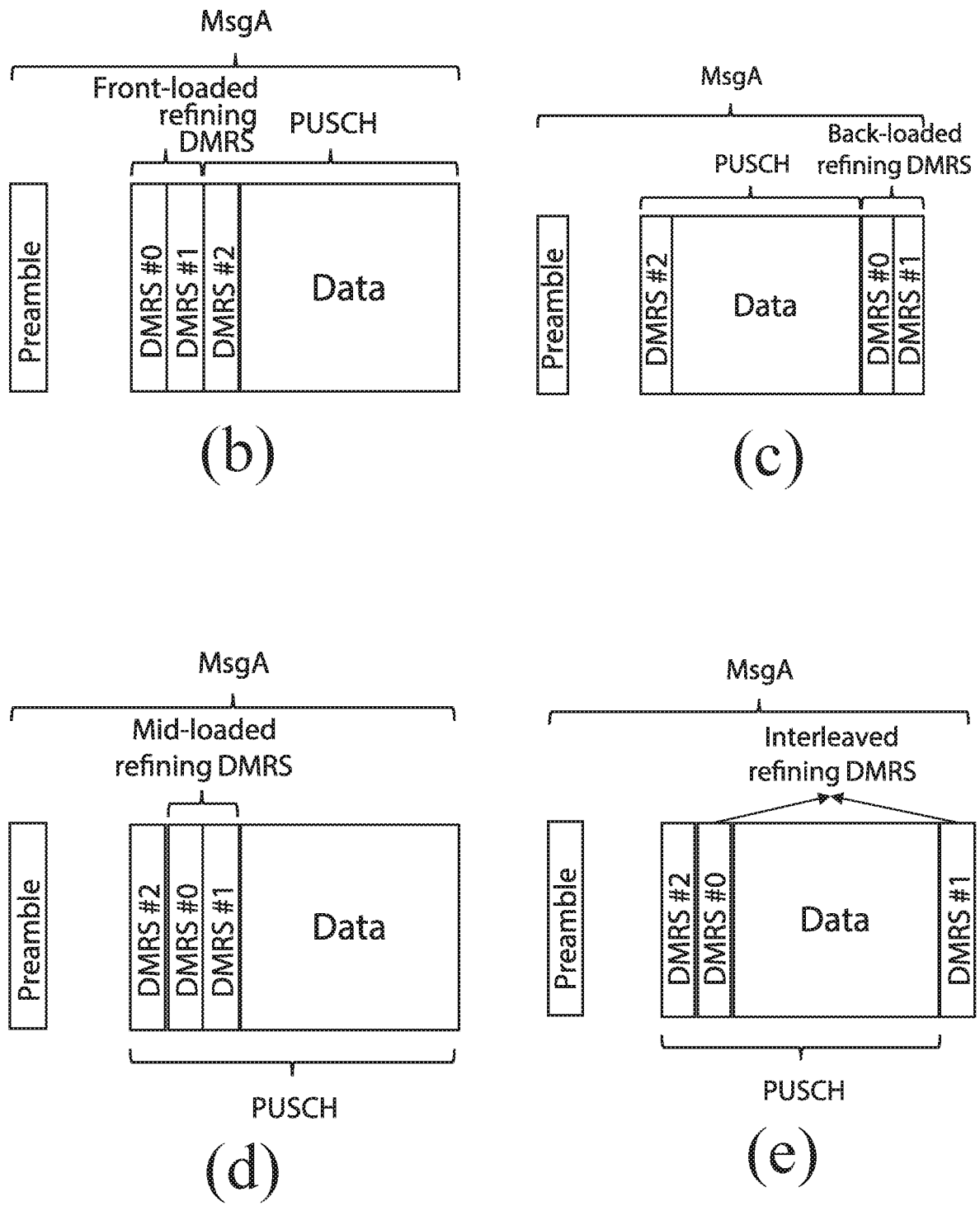

FIG. 5a illustrates a UE using a narrow high gain beam for the MsgA preamble, and using the front-loaded DMRS for the last refinement of the UE beam, completing P-3 within P-1. In this illustration, where N=2, the UE beam alignment may be accelerated through the use of the front-loaded DMRS to perform the DMRS refinement sweep, corresponding with P-3, when sending MsgA. The base station may then report MsgB back to the UE which of the front-loaded DMRS beams has the highest quality, which the UE may use for the next uplink message, such as for any UL transmissions beyond MsgA. Thus, the UE may use a more directive beam for the second phase (P-2), as well as reduce time needed in P-3.

Figure 6:
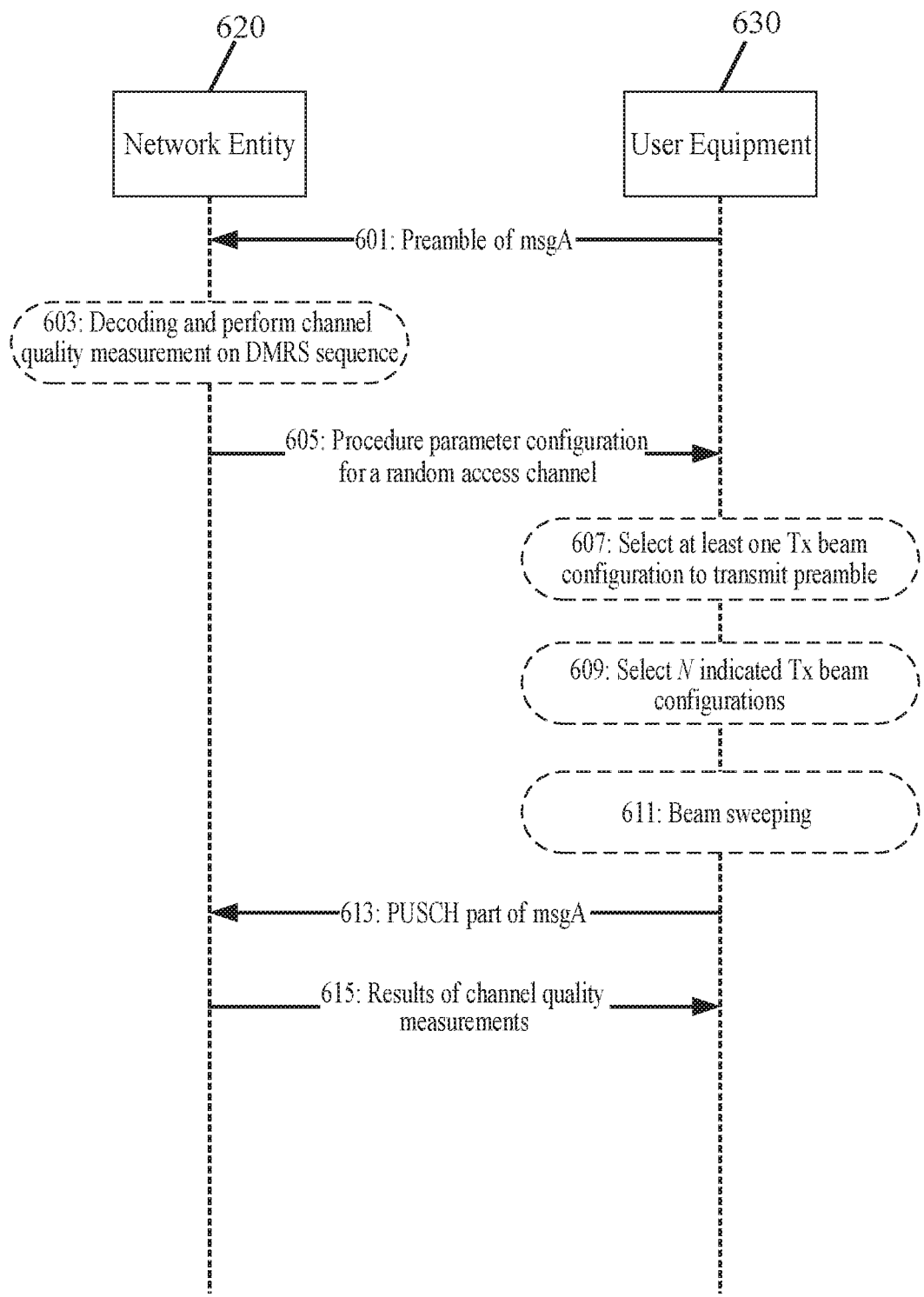
FIG. 6 illustrates an example of a signaling diagram according to certain example embodiments.

FIG. 6 illustrates an example of a signaling diagram showing communications between NE 620 and UE 630. NE 620 may be similar to NE 1510, and UE 630 may be similar to UE 1520, both illustrated in FIG. 15.

Figure 9:
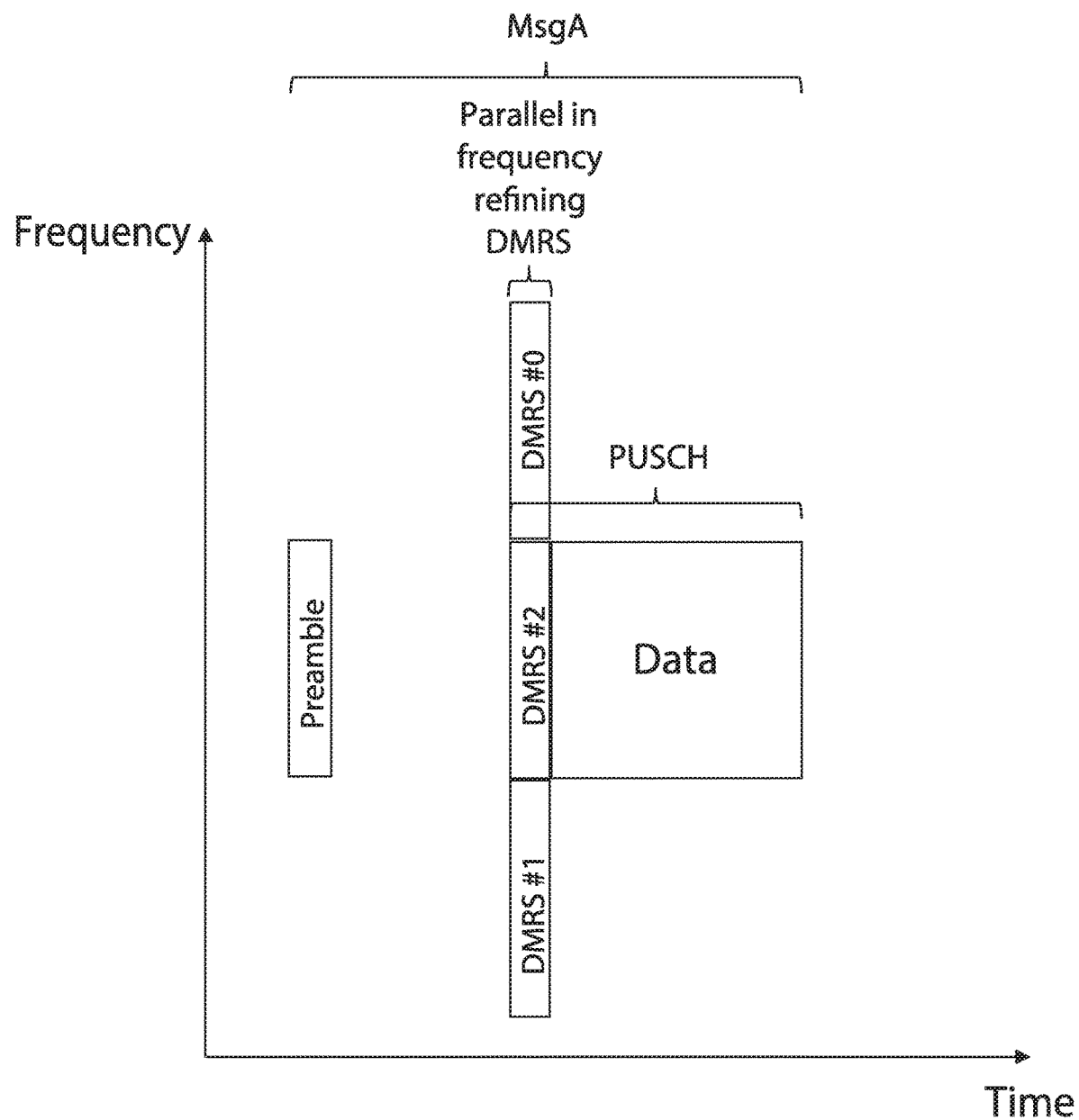
FIG. 9 illustrates an example of a demodulation reference signal transmitted parallel in frequency according to certain example embodiments.

In step 601, NE 620 may transmit at least one procedure parameter configuration for a random access channel to UE 630. The at least one parameter configuration may be a SSB sweep, informing UE 630 of the coverage via a remaining minimum system information RMSI (SIB1) of the at least one parameter configuration of the random access channel procedure. In some embodiments, the at least one parameter configuration may include at least one indication of a number of DMRS that may be included in the MsgA for beam refinement. In some embodiments, the DMRS may be an uplink transmission beam refinement DMRS, such as front-loaded (FIG. 5b), back-loaded (FIG. 5c), mid-loaded (FIG. 5d), or interleaved (FIG. 5e). In certain embodiments, the at least one demodulation reference signal may be transmitted parallel in frequency, as illustrated in FIG. 9, and/or the UE may select the at least one demodulation reference signal sequence/port may be grouped by time and frequency, whereby the set of DMRS sequences/ports and associated resources are selected by the UE. In some embodiments, NE 620 may indicate a number of Tx beam refining configurations, N, for the transmission of the DMRS part of MsgA. This may be associated with system information and/or other PRACH configuration parameters, for example, the actual DMRS sequences/ports to be used. In various embodiments, the DMRS sequences/ports for beam refinement may be back-loaded, and/or the same DMRS sequence may be used for different Tx beam configurations.

Additionally or alternatively, NE 620 may transmit, as part of the system information, whether UE 630 should send the DMRS sequence for assisting NE 620 in decoding the PUSCH in MsgA or not. In the latter case, NE 620 may be configured to perform the decoding of PUSCH aided by the Tx beam configurations of the DMRS, based on network capabilities.

In step 603, UE 630 may select at least one beam configuration for the transmission of the preamble part and/or the physical uplink shared channel part of a first random access channel message, which may be associated with at least one legacy mechanism. In some embodiments, the selection may be performed using standardized and/or UE implementation-specific mechanisms.

In step 605, UE 630 may select N indicated Tx beam configurations for the transmission of the DMRS part of MsgA. In certain embodiments, at least N Tx beam configurations for the transmission of the DMRS part of MsgA may have narrower beam-widths as compared with the Tx beam configuration for the transmission of the preamble part and the PUSCH part of MsgA.

In step 607, UE 630 may transmit at least one physical uplink shared channel part of a first random access channel message using at least one transmitter beam configuration to NE 620. In some embodiments, the transmission may be according to the PRACH configuration signaled in system information and/or to standardized procedures using the at least one determined Tx beam configuration. In some embodiments, the N Tx beam configurations may be non-overlapping or at least only partially overlapping, may have narrow beam width as compared to the Tx beam configuration used for the transmission of the preamble part of msgA, and/or all together may have approximately the same angular spread as the Tx beam configuration used for the transmission of the preamble part of msgA.

In step 609, UE 630 may perform beam sweeping during the transmission of the DMRS part of the MsgA, which may be associated with the N Tx beam configurations. In some embodiments, the beam performing may sequentially transmit the DMRS sequences using the determined N Tx beam configurations. Additionally, the frequency and time resources for the transmission of the DMRS part of MsgA may also be determined based on the PRACH configuration signaled in the system information and standardized procedures. In some embodiments, a separation between subsequent DMRS transmissions may be configured to allow for the required time to change the Tx beam configuration, such as a gap before the transmission of the first DMRS using the first of N Tx beam configurations and a gap after the transmission of the last DMRS using the last of N Tx beam configurations.

In step 611, UE 630 may transmit at least one physical uplink shared channel part of a first random access channel message using at least one transmitter beam. In some embodiments, the PUSCH part of MsgA may comprise at least one DMRS sequence. In some embodiments, the PUSCH part may also include at least one DMRS sequence for assisting the NE 620 with channel estimation and decoding of the data part of the PUSCH transmission.

In step 613, NE 620 may, upon detection of at least one preamble part of the first random access channel message, begin decoding the physical uplink shared channel part of the first random access channel message and perform at least one channel quality measurement on at least one demodulation reference signal sequence transmitted on a number of selected transmitter beam configurations. NE 620 may perform at least one measurement on each of the reference signals received from UE 630 in the DMRS part of MsgA using N different Tx beam configurations. NE 620 may use these measurements to perform channel estimation and decode the data part of MsgA. Additionally or alternatively, NE 620 may use the DMRS sequence transmitted as part of the PUSCH portion of MsgA. NE 620 may then determine the channel quality in correspondence of each of the reference signals transmitted by UE 630 in the DMRS part of MsgA using N different Tx beam configurations.

In step 615, NE 620 may transmit at least one indication of feedback on the at least one channel quality measurement to the user equipment in a second random access channel message of the random access channel procedure to UE 630. In some embodiments, the at least one indication of feedback comprises at least one indication that the Tx beam configuration is associated with the best channel quality.

In some embodiments, NE 620 may signal the maximum number, M, of Tx beam configurations for the transmission of the DMRS part of MsgA in the system information, allowing UE 630 to determine how many to select among them. In this case, UE may select T∈[1 . . . M] Tx beam configurations, and transmit only T reference signals in the DMRS part of MsgA. In this case, NE 620 may only detect how many Tx beam configurations, and DMRS sequences, UE 630 has transmitted.

Figure 7:
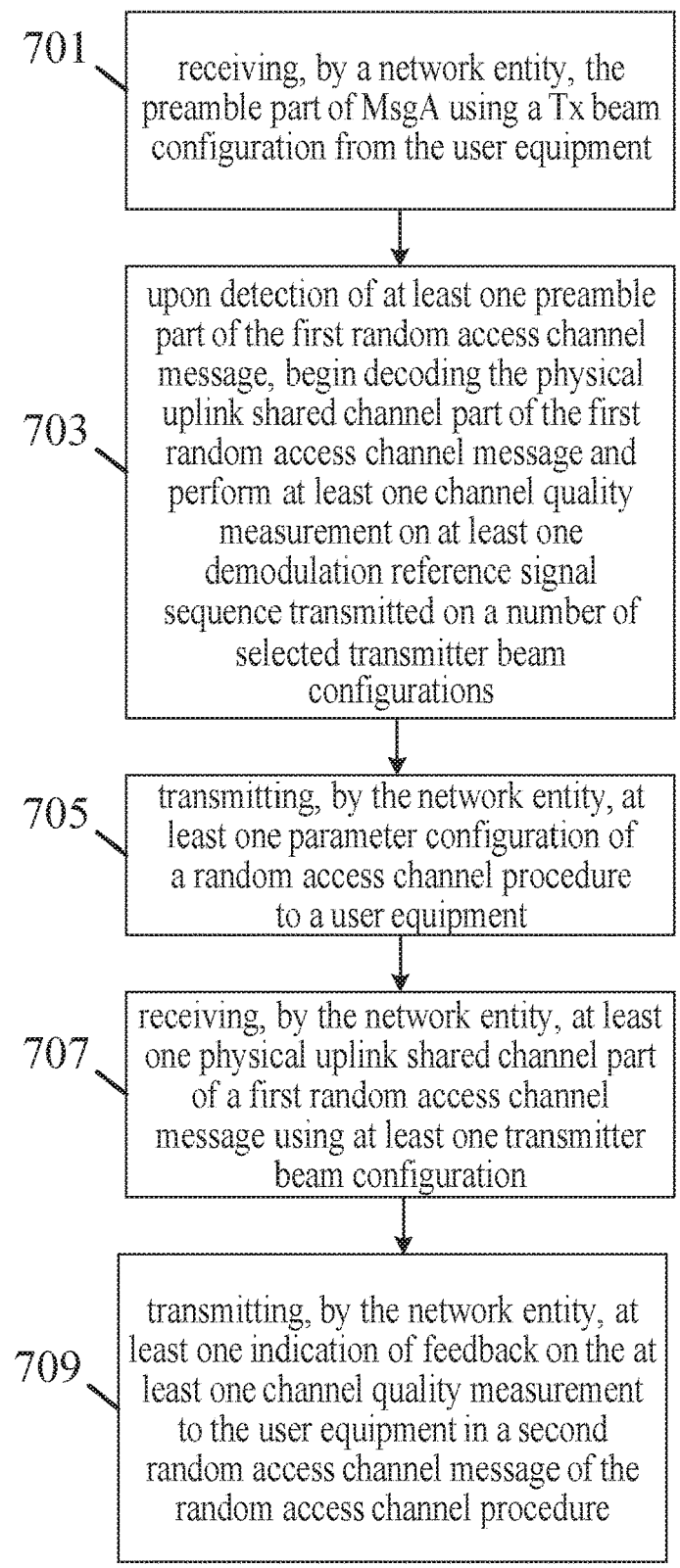
FIG. 7 illustrates an example of a method performed by a network entity according to certain example embodiments.
Figure 15:
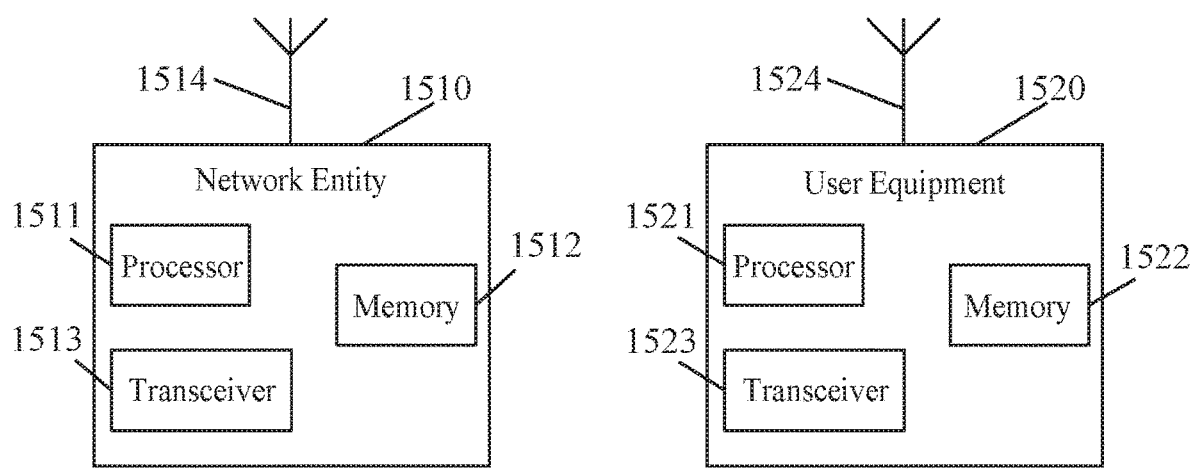
FIG. 15 illustrates an example of a system according to certain example embodiments.
Figure 16:
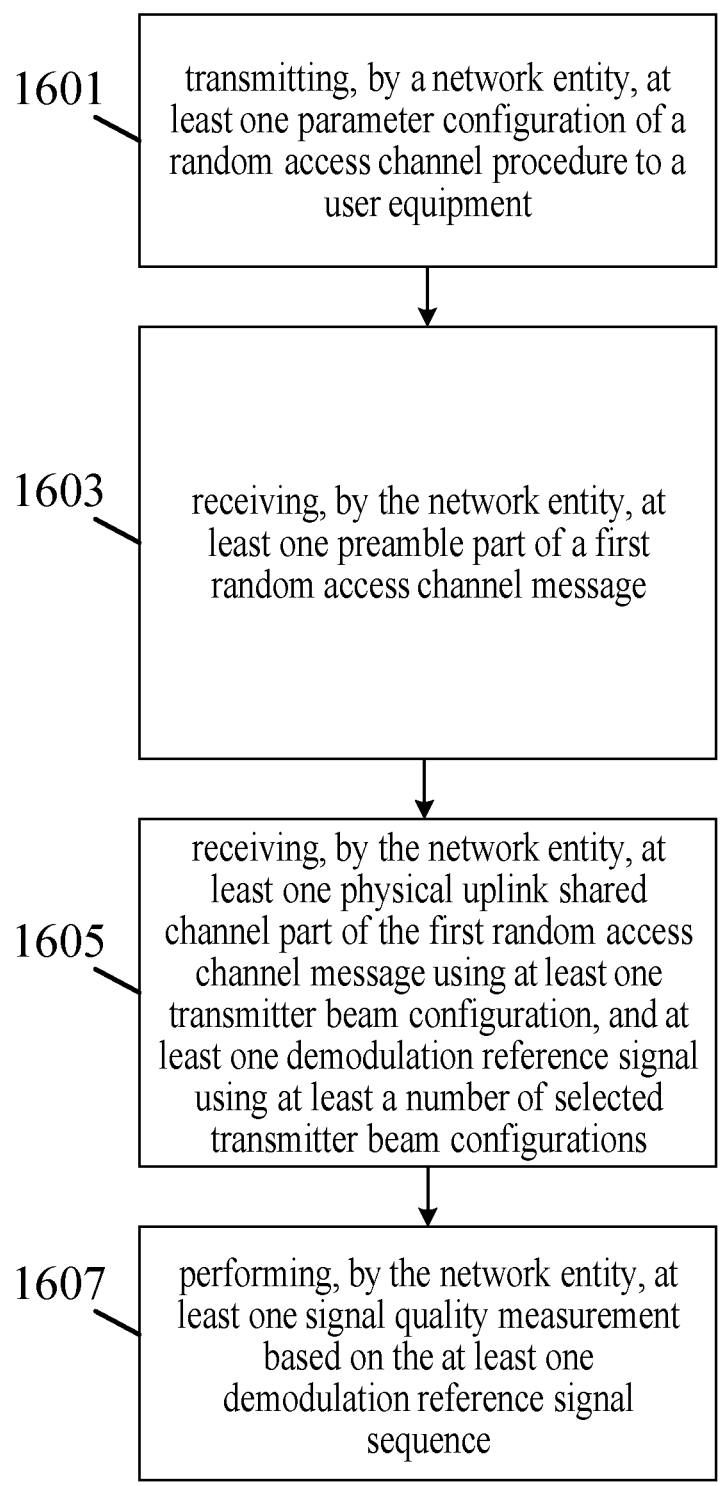
FIG. 16 illustrates an example of a method performed by a network entity according to certain example embodiments.
Figure 17:
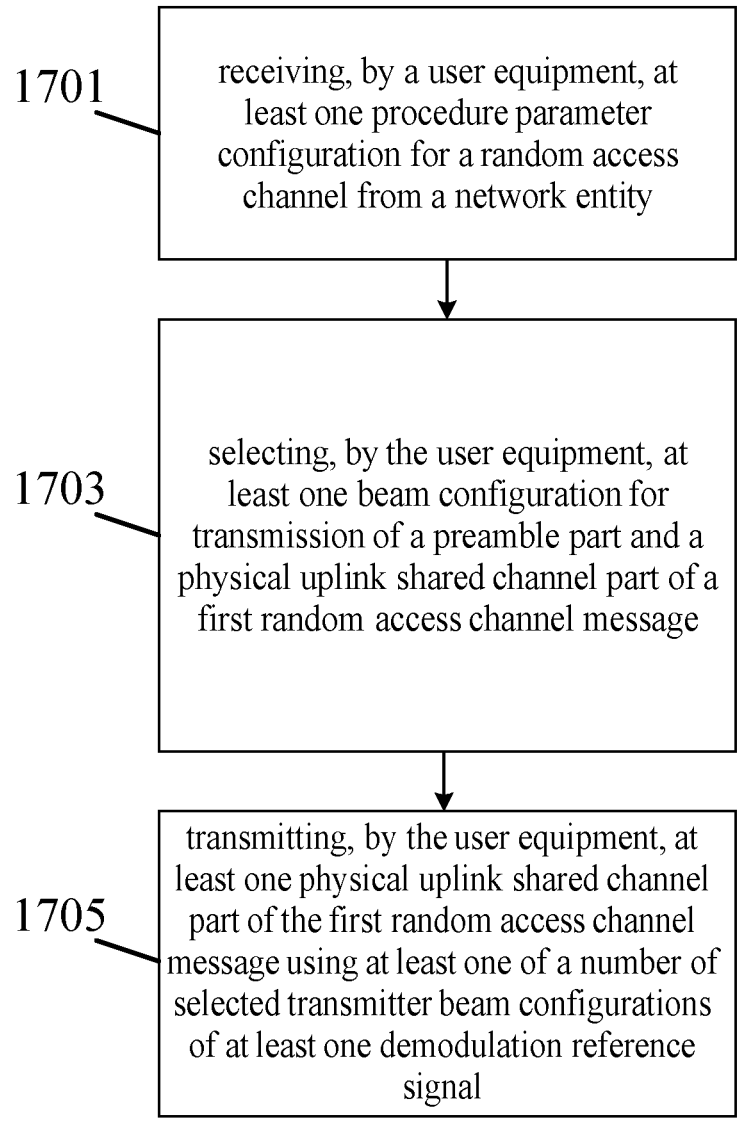
FIG. 17 illustrates an example of a method performed by a user equipment according to certain example embodiments.
Figure 18:
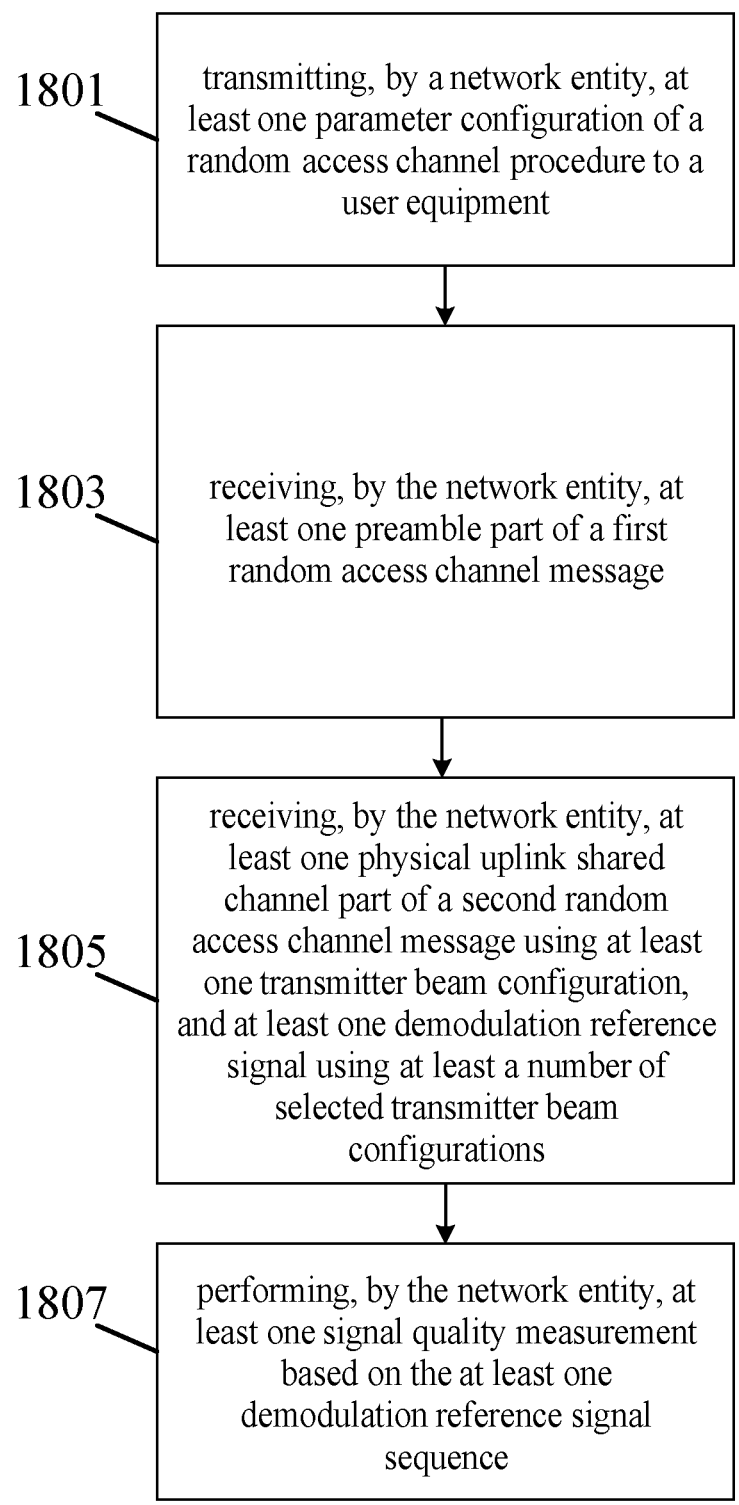
FIG. 18 illustrates an example of a method performed by a network entity according to certain example embodiments.
Figure 19:
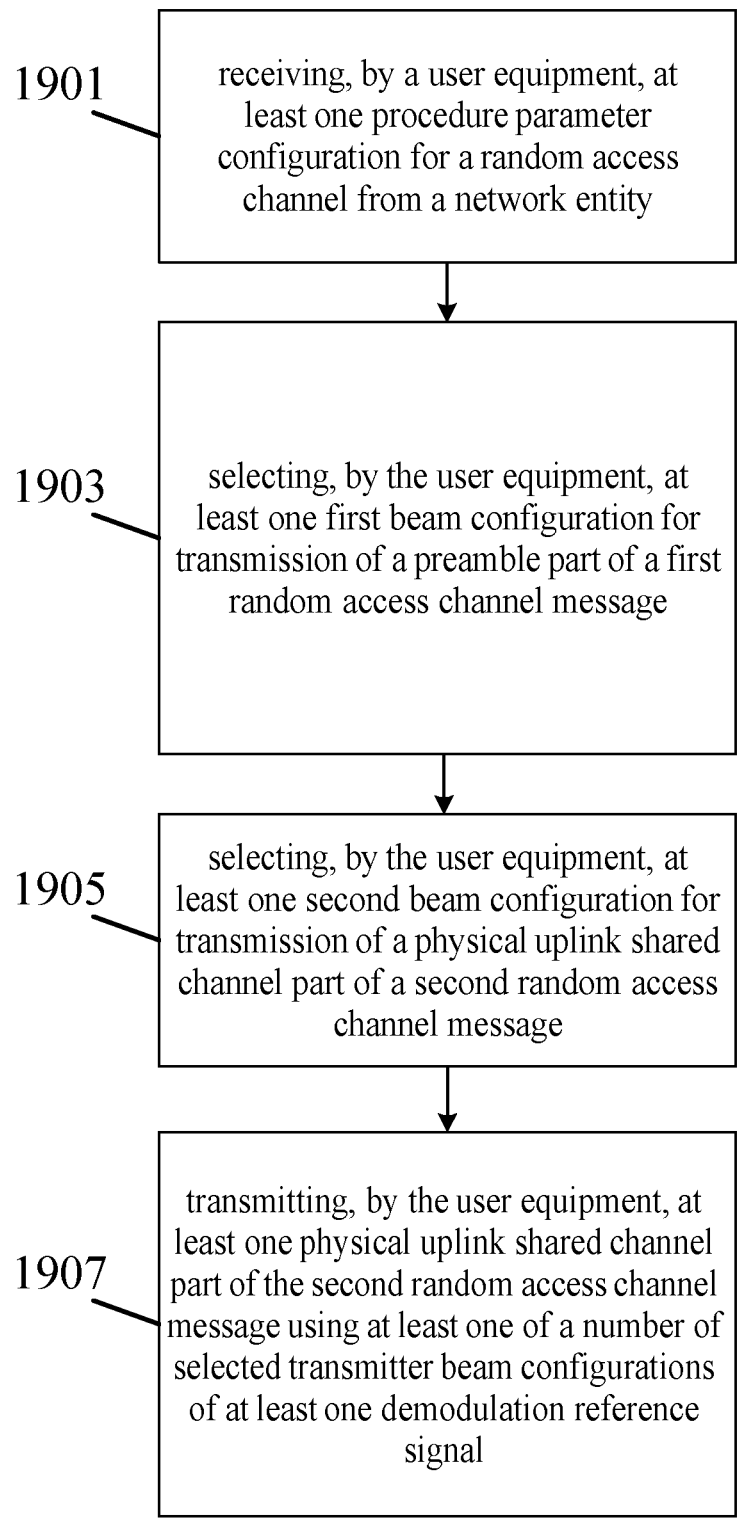
FIG. 19 illustrates an example of a method performed by a user equipment according to certain example embodiments.
Figure 20:
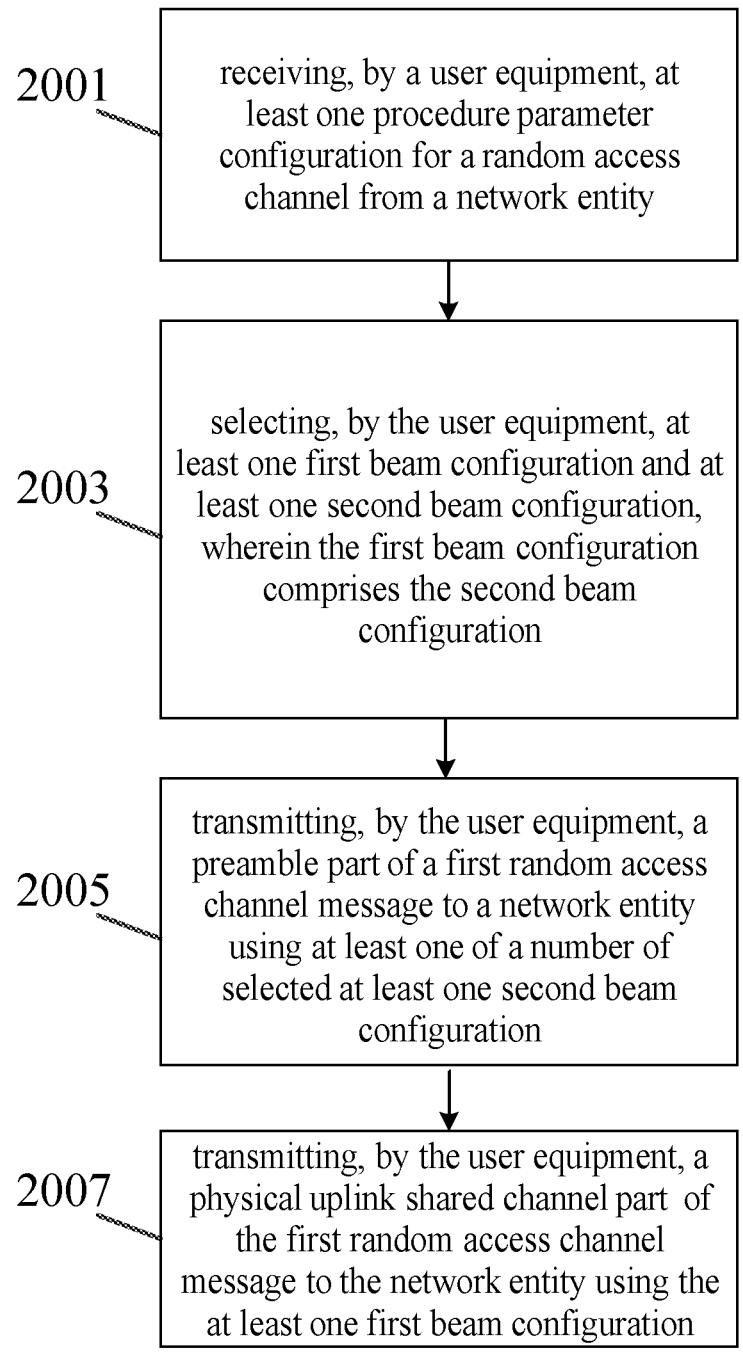
FIG. 20 illustrates an example of a method performed by a user equipment according to certain example embodiments.
Figure 21:
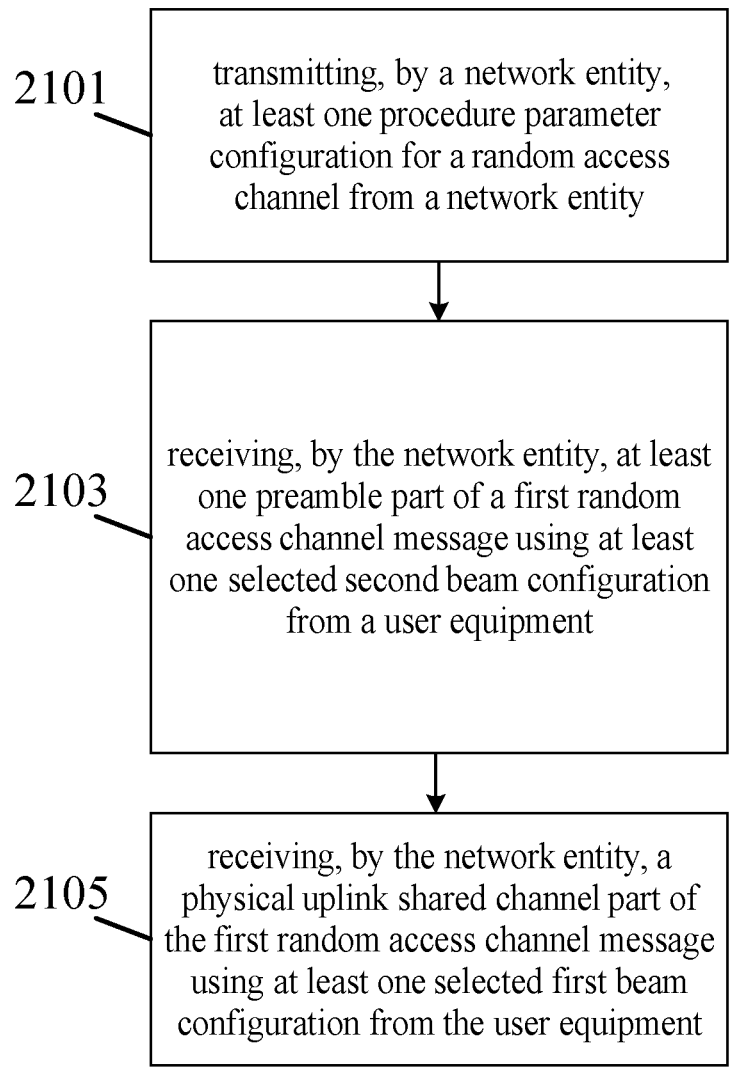
FIG. 21 illustrates an example of a method performed by a network entity according to certain example embodiments.
Figure 22:
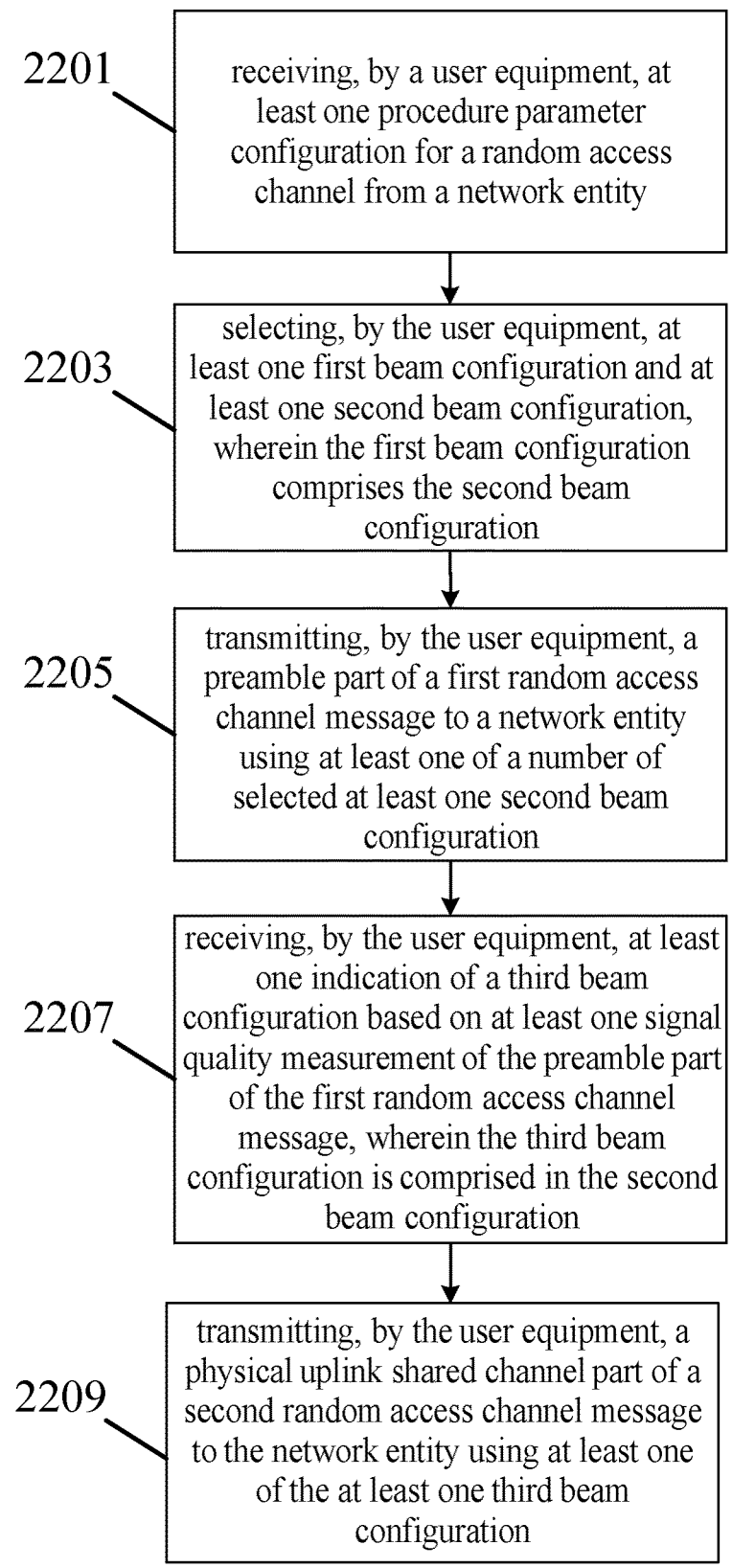
FIG. 22 illustrates an example of a method performed by a user equipment according to certain example embodiments.
Figure 23:
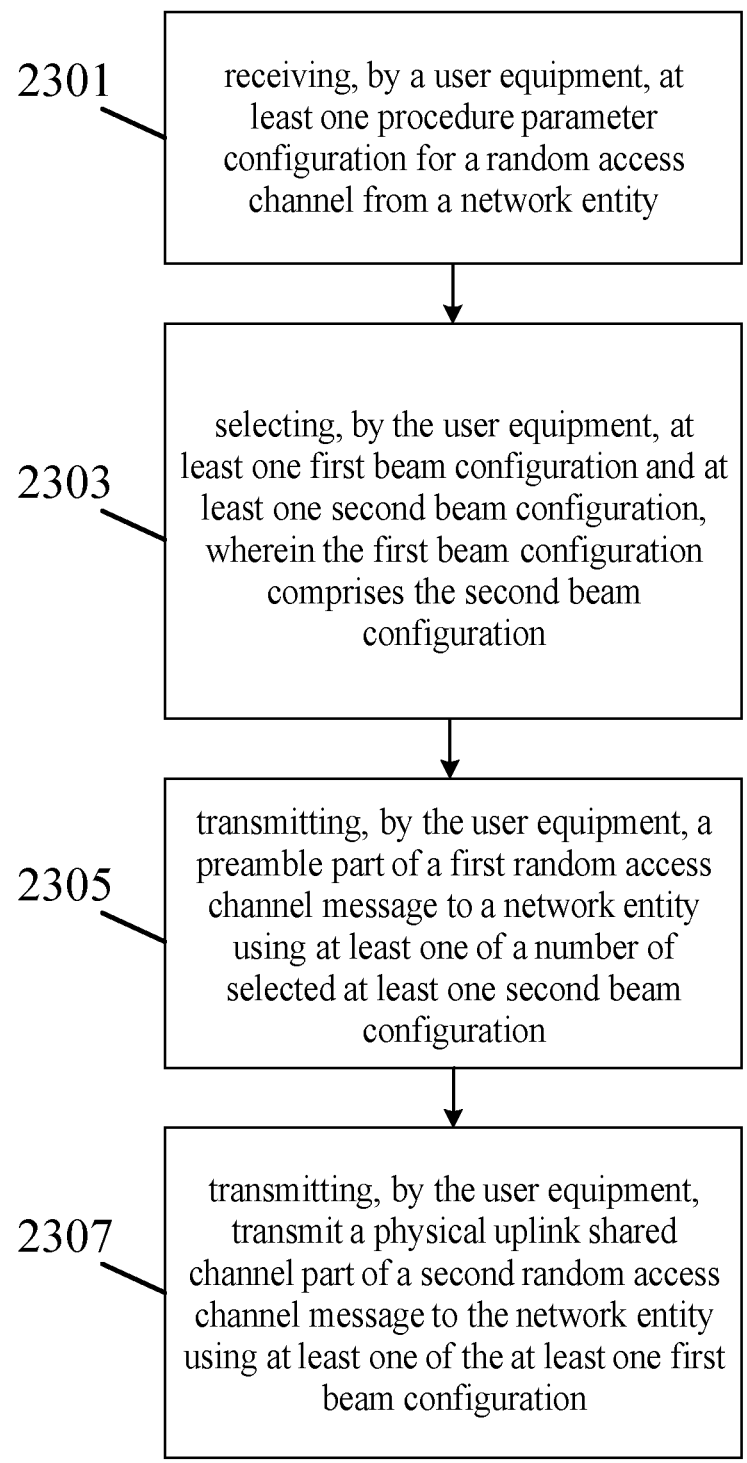
FIG. 23 illustrates an example of a method performed by a user equipment according to certain example embodiments.
Figure 24:
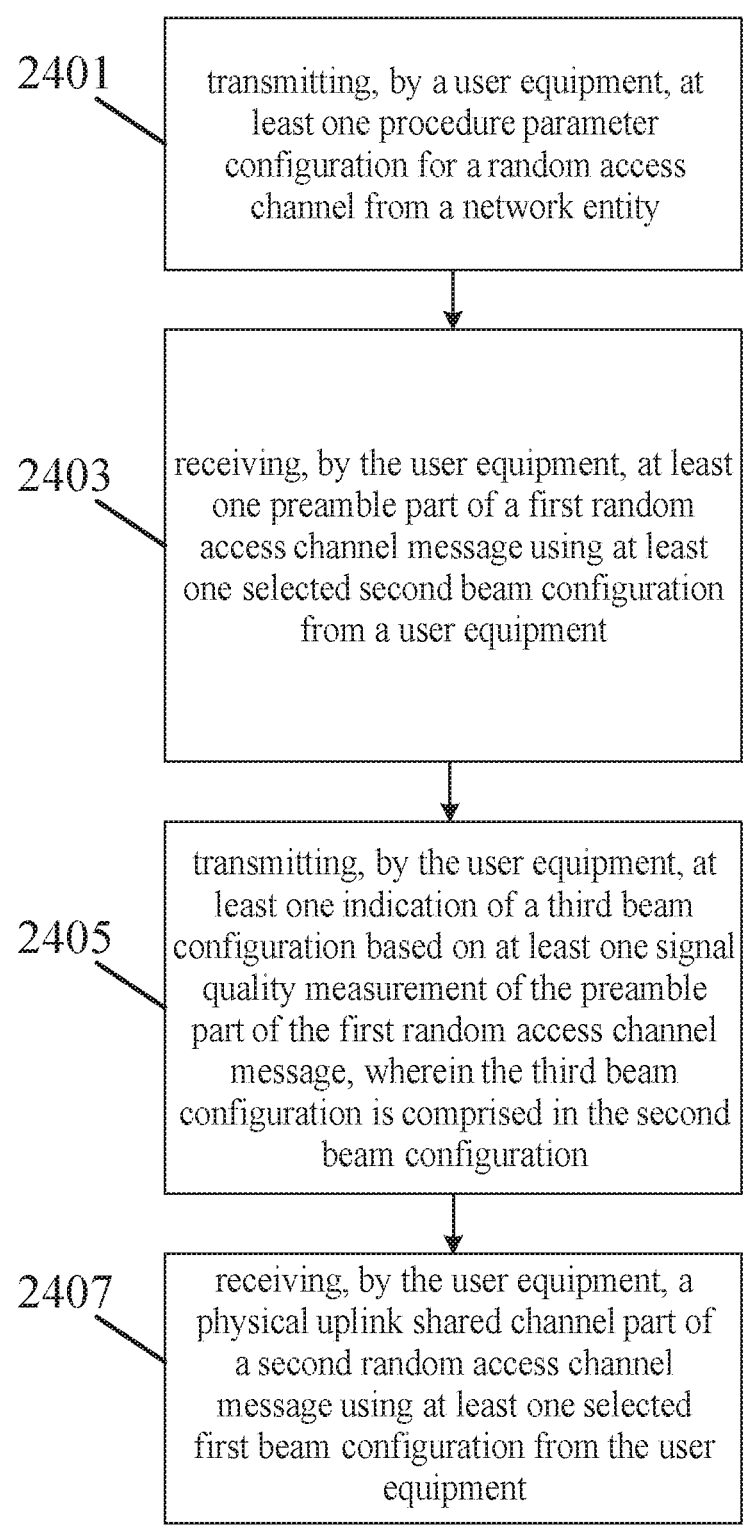
FIG. 24 illustrates an example of a method performed by a user equipment according to certain example embodiments.
Figure 25:
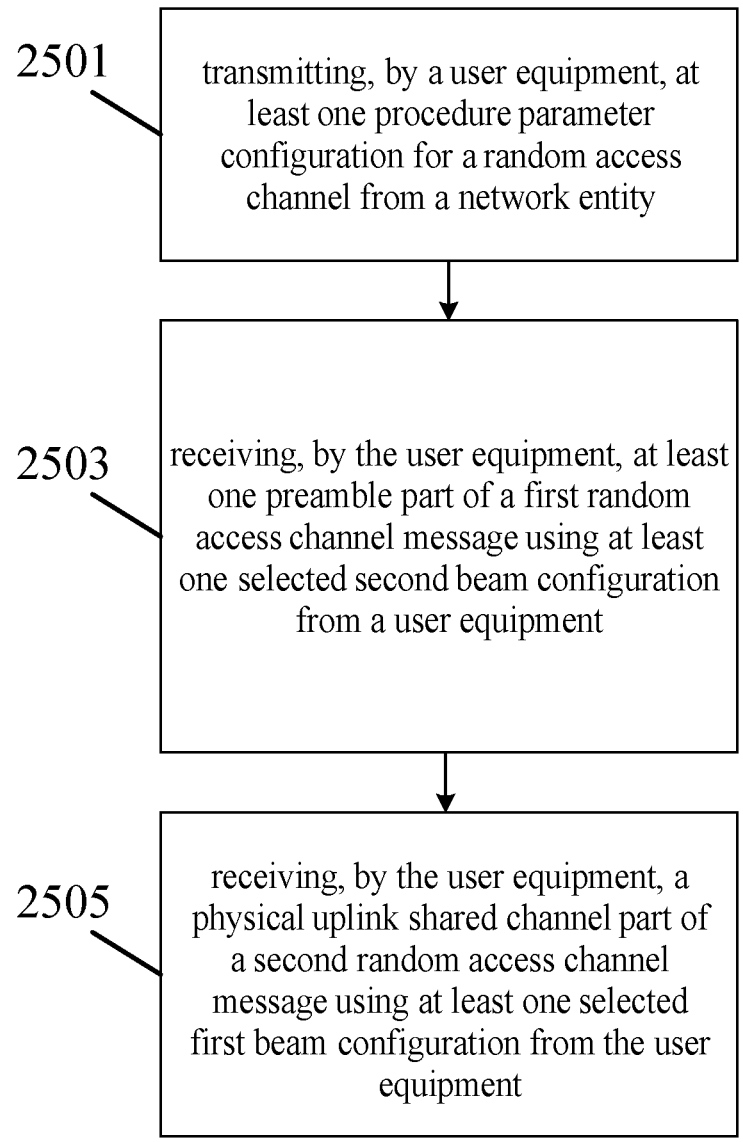
FIG. 25 illustrates an example of a method performed by a user equipment according to certain example embodiments.

FIG. 7 illustrates an example of a method performed by a NE, such as NE 1510 in FIG. 15. In step 701, the NE may transmit at least one parameter configuration of a random access channel procedure to a user equipment, such as UE 1520 in FIG. 15. The at least one parameter configuration may be a SSB sweep, informing the UE of the coverage via a RMSI (SIB1) of the at least one parameter configuration of the random access channel procedure. In some embodiments, the at least one parameter configuration may include at least one indication of a number of DMRS that may be included in the MsgA for beam refinement. In some embodiments, the DMRS may be an uplink transmission beam refinement DMRS, such as front-loaded (FIG. 5*b*), back-loaded (FIG. 5*c*), mid-loaded (FIG. 5*d*), or interleaved (FIG. 5*e*). In certain embodiments, the at least one demodulation reference signal may be transmitted parallel in frequency, as illustrated in FIG. 9, and/or the UE may select the at least one demodulation reference signal sequence/port may be grouped by time and frequency, whereby the set of DMRS sequences/ports and associated resources are selected by the UE. Additionally, the DMRS sequences/ports for beam refinement may be back-loaded, and/or the same DMRS sequence may be used for different Tx beam configurations. In some embodiments, NE 620 may indicate a number of Tx beam refining configurations, N, for the transmission of the DMRS part of MsgA. This may be associated with system information and/or other PRACH configuration parameters, for example, the actual DMRS sequences/ports to be used.

Additionally or alternatively, the NE may transmit, as part of the system information, whether the UE should send the DMRS sequence for assisting the NE in decoding the PUSCH in MsgA or not. In the latter case, the NE may be configured to perform the decoding of PUSCH aided by the Tx beam configurations of the DMRS, based on network capabilities.

In step 703, the NE may receive the preamble part of MsgA using the Tx beam configuration from the user equipment. In some embodiments, the transmission may be according to the PRACH configuration signaled in system information and/or to standardized procedures using the at least one determined Tx beam configuration. In some embodiments, the N Tx beam configurations may be non-overlapping or at least only partially overlapping, may have narrow beam width as compared to the Tx beam configuration used for the transmission of the preamble part of msgA, and/or all together may have approximately the same angular spread as the Tx beam configuration used for the transmission of the preamble part of msgA.

In step 705, the NE may receive at least one physical uplink shared channel part of a first random access channel message using at least one transmitter beam configuration. In some embodiments, the PUSCH part of MsgA may comprise at least one DMRS sequence. In some embodiments, the PUSCH part may also include at least one DMRS sequence for assisting the NE with channel estimation and decoding of the data part of the PUSCH transmission.

In step 707, the network entity may, upon detection of at least one preamble part of the first random access channel message, begin decoding the physical uplink shared channel part of the first random access channel message and perform at least one channel quality measurement on at least one demodulation reference signal sequence transmitted on a number of selected transmitter beam configurations. The NE may perform at least one measurement on each of the reference signals received from the UE in the DMRS part of MsgA using N different Tx beam configurations. The NE may use these measurements to perform channel estimation and decode the data part of MsgA. Additionally or alternatively, the NE may use the DMRS sequence transmitted as part of the PUSCH portion of MsgA. The NE may then determine the channel quality in correspondence of each of the reference signals transmitted by the UE in the DMRS part of MsgA using N different Tx beam configurations.

In step 709, the NE may transmit at least one indication of feedback on the at least one channel quality measurement to the user equipment in a second random access channel message of the random access channel procedure. In some embodiments, the at least one indication of feedback comprises at least one indication that the Tx beam configuration is associated with the best channel quality.

In some embodiments, the NE may signal the maximum number, M, of Tx beam configurations for the transmission of the DMRS part of MsgA in the system information, allowing the UE to determine how many to select among them. In this case, UE may select T∈[1 . . . M] Tx beam configurations, and transmit only T reference signals in the DMRS part of MsgA. In this case, the NE may only detect how many Tx beam configurations, and DMRS sequences, the UE has transmitted.

Figure 8:
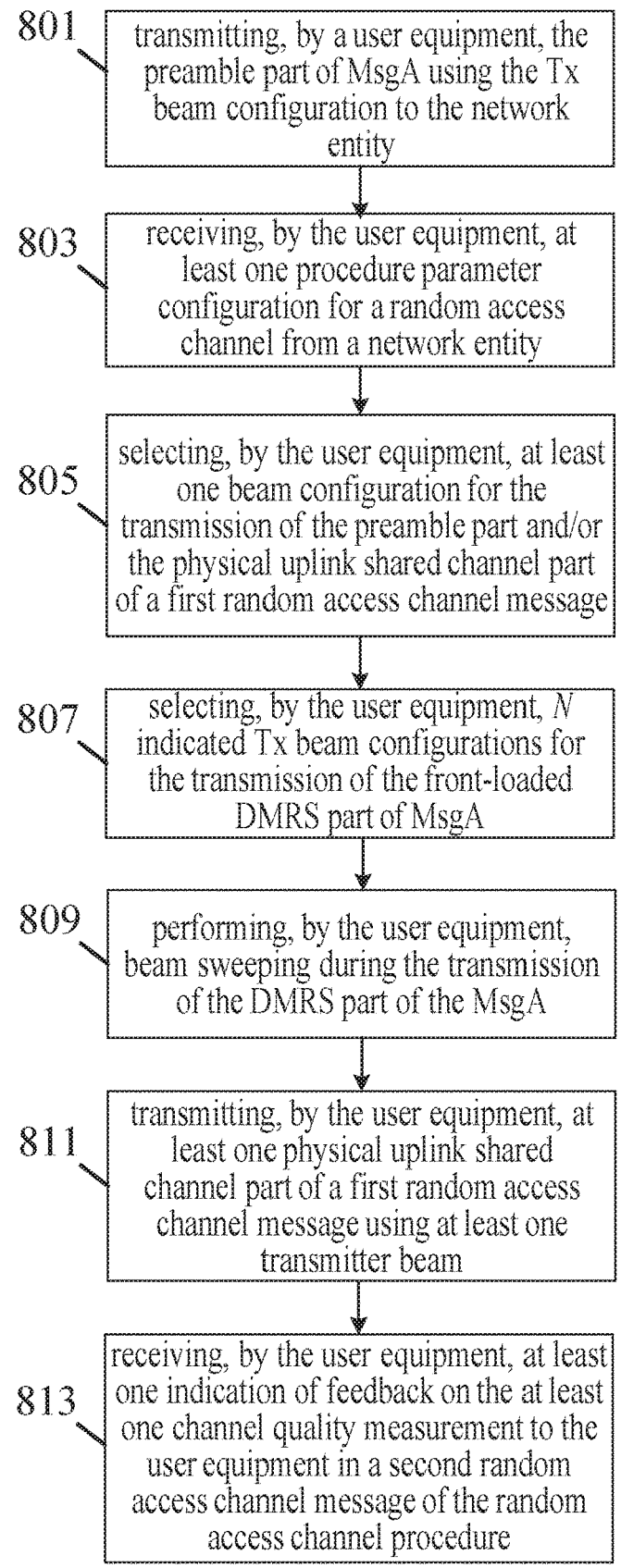
FIG. 8 illustrates an example of a method performed by a user equipment according to certain example embodiments.

FIG. 8 illustrates an example of a method performed by a UE, such as UE 1520 in FIG. 15. In step 801, the UE may receive at least one procedure parameter configuration for a random access channel from a network entity, such as NE 1510 in FIG. 15. The at least one parameter configuration may be a SSB sweep, informing the UE of the coverage via a RMSI (SIB1) of the at least one parameter configuration of the random access channel procedure. In some embodiments, the at least one parameter configuration may include at least one indication of a number of DMRS that may be included in the MsgA for beam refinement. In some embodiments, the DMRS may be an uplink transmission beam refinement DMRS, such as front-loaded (FIG. 5*b*), back-loaded (FIG. 5*c*), mid-loaded (FIG. 5*d*), or interleaved (FIG. 5*e*). In certain embodiments, the at least one demodulation reference signal may be transmitted parallel in frequency, as illustrated in FIG. 9, and/or the UE may select the at least one demodulation reference signal sequence/port may be grouped by time and frequency, whereby the set of DMRS sequences/ports and associated resources are selected by the UE. Additionally, the DMRS sequences/ports for beam refinement may be back-loaded, and/or the same DMRS sequence may be used for different Tx beam configurations. In some embodiments, the UE may indicate a number of Tx beam refining configurations, N, for the transmission of the DMRS part of MsgA. This may be associated with system information and/or other PRACH configuration parameters, for example, the actual DMRS sequences/ports to be used.

Additionally or alternatively, the UE may transmit, as part of the system information, an indication of whether the UE should send the DMRS sequence for assisting the NE in decoding the PUSCH in MsgA or not. In the latter case, the NE may be configured to perform the decoding of PUSCH aided by the Tx beam configurations of the DMRS, based on network capabilities.

In step 803, the UE may select at least one beam configuration for the transmission of the preamble part and/or the physical uplink shared channel part of a first random access channel message, which may be associated with at least one legacy mechanism. In some embodiments, the selection may be performed using standardized and/or UE implementation-specific mechanisms.

In step 805, the UE may select N indicated Tx beam configurations for the transmission of the DMRS part of MsgA. In certain embodiments, at least N Tx beam configurations for the transmission of the DMRS part of MsgA may have narrower beam-widths as compared with the Tx beam configuration for the transmission of the preamble part and the PUSCH part of MsgA.

In step 807, the UE may transmit the preamble part of MsgA using the Tx beam configuration to the NE. In some embodiments, the transmission may be according to the PRACH configuration signaled in system information and/ or to standardized procedures using the at least one determined Tx beam configuration. In some embodiments, the N Tx beam configurations may be non-overlapping or at least only partially overlapping, may have narrow beam width as compared to the Tx beam configuration used for the transmission of the preamble part of msgA, and/or all together may have approximately the same angular spread as the Tx beam configuration used for the transmission of the preamble part of msgA.

In step 809, the UE may perform beam sweeping during the transmission of the DMRS part of the MsgA, which may be associated with the N Tx beam configurations. In some embodiments, the beam performing may sequentially transmit the DMRS sequences using the determined N Tx beam configurations. Additionally, the frequency and time resources for the transmission of the DMRS part of MsgA may also be determined based on the PRACH configuration signaled in the system information and standardized procedures. In some embodiments, a separation between subsequent DMRS transmissions may be configured to allow for the required time to change the Tx beam configuration, such as a gap before the transmission of the first DMRS using the first of N Tx beam configurations and a gap after the transmission of the last DMRS using the last of N Tx beam configurations.

In step 811, the UE may transmit at least one physical uplink shared channel part of a first random access channel message using at least one transmitter beam. In some embodiments, the PUSCH part of MsgA may comprise at least one DMRS sequence. In some embodiments, the PUSCH part may also include at least one DMRS sequence for assisting the NE with channel estimation and decoding of the data part of the PUSCH transmission.

In step 813, the UE may receive at least one indication of feedback on the at least one channel quality measurement to the user equipment in a second random access channel message of the random access channel procedure. In some embodiments, the at least one indication of feedback may comprise at least one indication that the Tx beam configuration is associated with the best channel quality.

In some embodiments, the NE may signal the maximum number, M, of Tx beam configurations for the transmission of the DMRS part of MsgA in the system information, allowing the UE to determine how many to select among them. In this case, UE may select T∈[1 . . . M] Tx beam configurations, and transmit only T reference signals in the DMRS part of MsgA. In this case, the NE may only detect how many Tx beam configurations, and DMRS sequences, the UE has transmitted.

Some embodiments may relate to preamble-based UL beam refinement. For example, when a first random access channel message, such as MsgA, PRACH preamble format has a short duration, such as preamble format A1, and when the first random access channel message PUSCH format has a payload of 72 bits, the coverage of the first random access channel message PRACH may be about 3 dB worse than that of the first random access channel message PUSCH.

Figure 10:
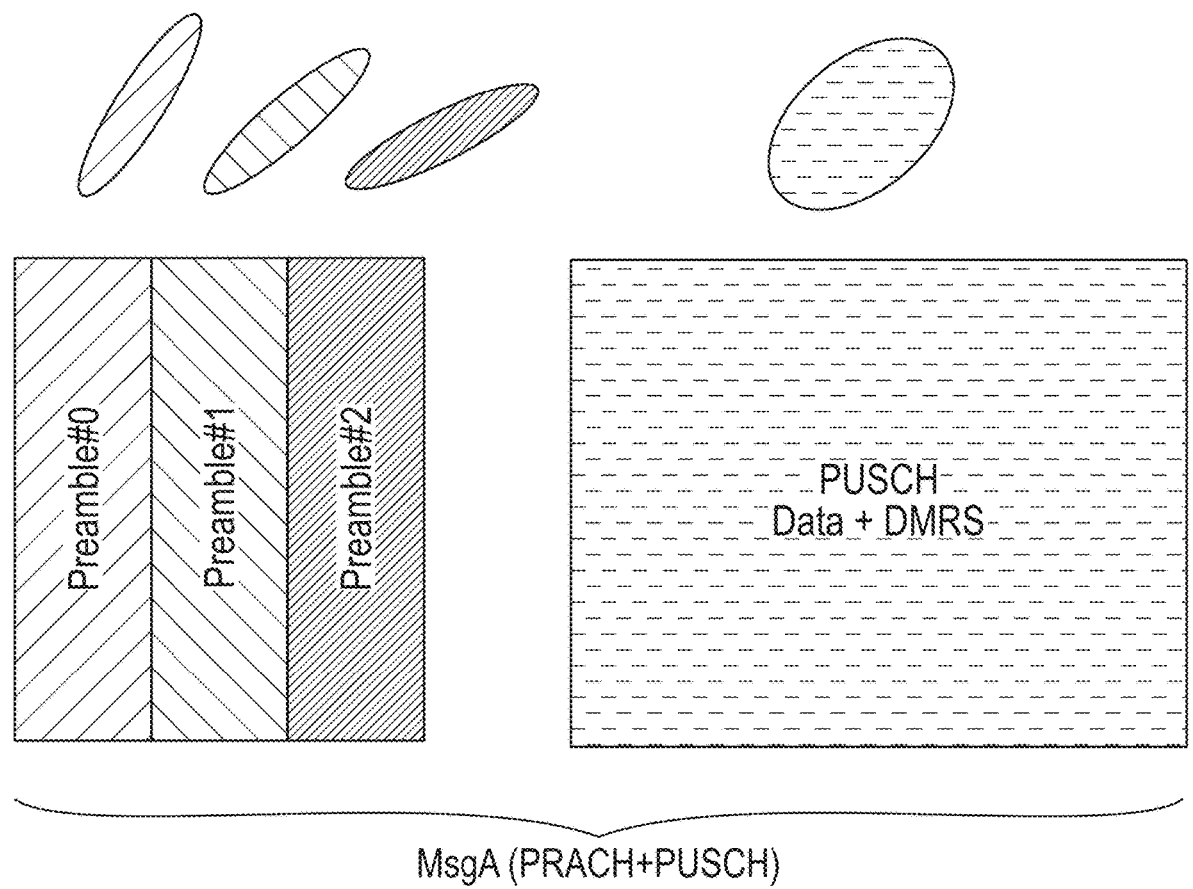
FIG. 10 illustrates an example of an uplink transmission with narrow beams for MsgA physical random access channel and wide beam for MsgA physical uplink shared channel according to certain example embodiments.
Figure 11:
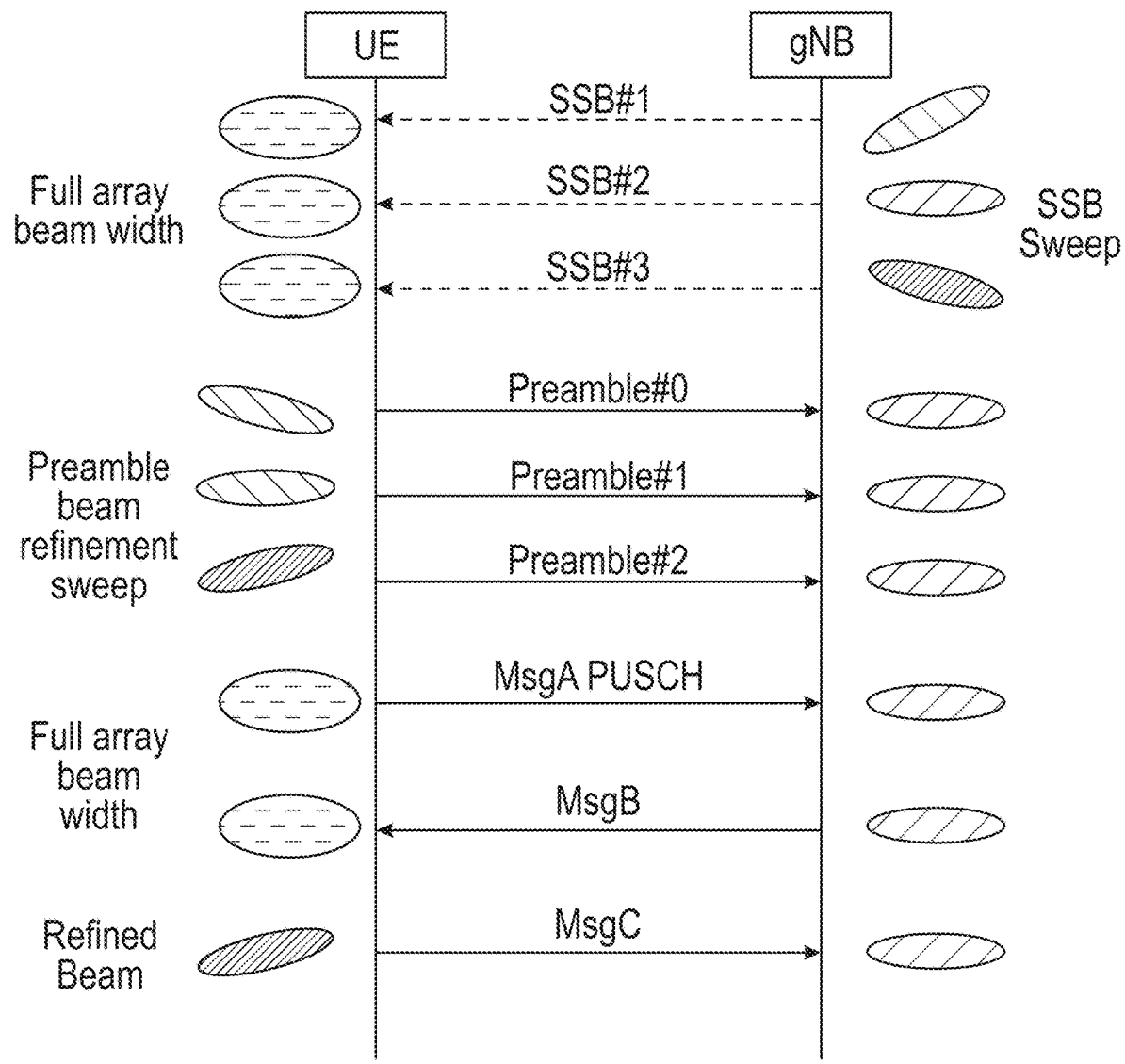
FIG. 11 illustrates an example of a physical random access channel beam refinement procedure according to certain example embodiments.

To improve coverage for a first random access channel message PRACH, narrower uplink transmission beams may be used to transmit first random access channel message PRACH, causing the coverage to improve by the increase of the antenna gain. Furthermore, transmitting multiple narrow beams for first random access channel message PRACH may provide an opportunity for uplink transmission beam refinement, as illustrated in FIG. 10. The first random access channel message PUSCH transmission may use a wide uplink transmission beam that covers all directions of the first random access channel message PRACH narrow uplink transmission beams. FIG. 11 illustrates a MsgA PRACH beam refinement procedure according to certain embodiments.

Figure 12:
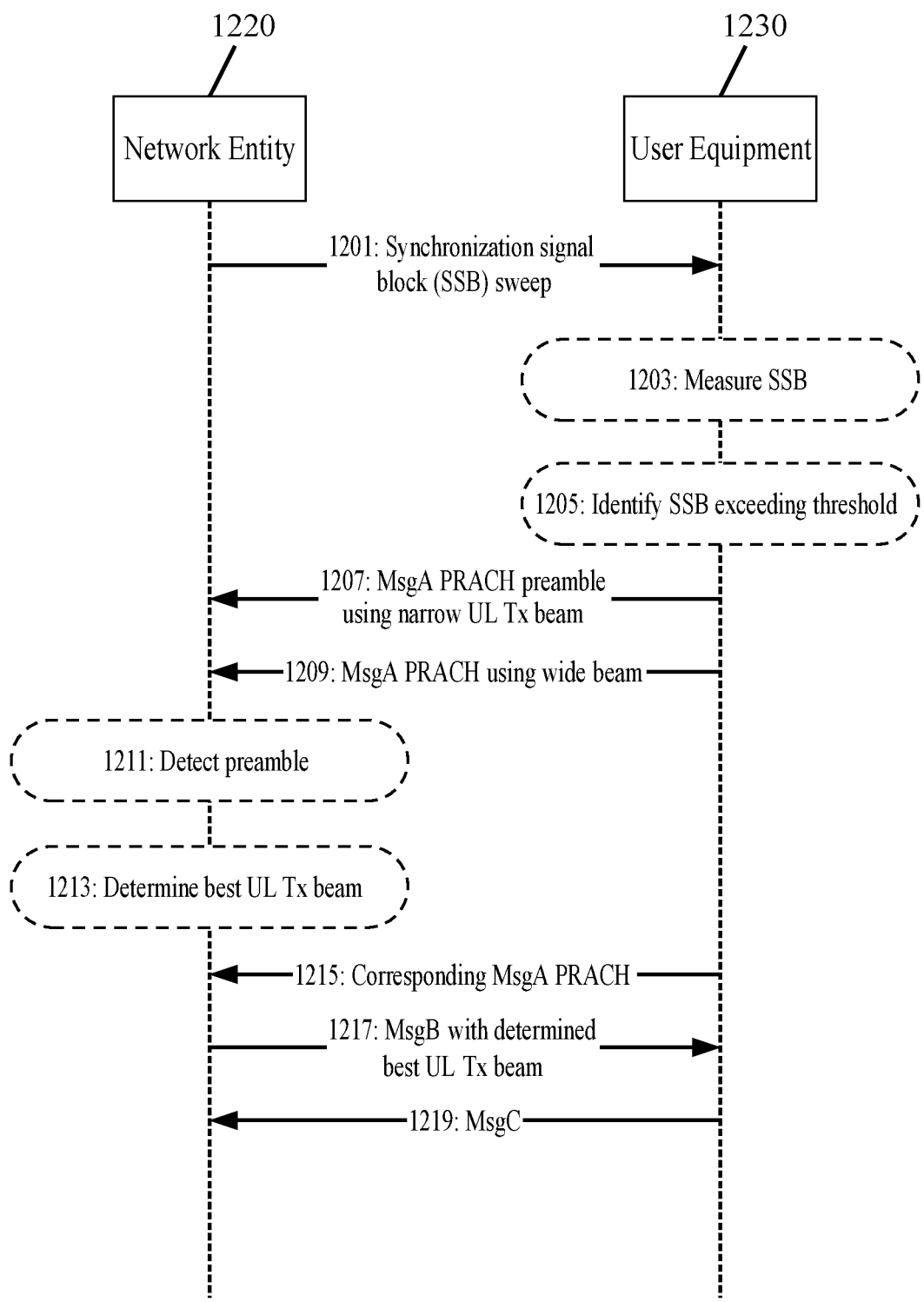
FIG. 12 illustrates another example of a signaling diagram according to certain example embodiments.

FIG. 12 illustrates an example of a signaling diagram showing communications between NE 1220 and UE 1230. NE 1220 may be similar to NE 1510, and UE 1230 may be similar to UE 1520, both illustrated in FIG. 15. In step 1201, NE 1220 may perform at least one synchronization signal block (SSB) sweep, which may be received by UE 1230. In step 1203, UE 1230 may measure the at least one SSB. In step 1205, UE 1230 may identify at least one of the at least one SSBs which exceed a predetermined threshold. In step 1207, UE 1230 may transmit at least one first random access channel message, such as MsgA, PRACH preamble using at least one narrow uplink transmission beam. The at least one narrow uplink transmission beam may be in the direction of the received at least one SSB from NE 1220.

In step 1209, UE 1230 may transmit at least one first random access channel message, such as MsgA, PUSCH to NE 1220 using at least one wide beam covering each of the at least one narrow uplink transmission beams. In step 1211, NE 1220 may detect at least one PRACH preamble transmitted from UE 1230. In step 1213, NE 1220 may identify at least one uplink transmission beam exceeding at least one predefined quality threshold. In step 1215, NE 1220 may receive at least one corresponding first random access channel message PUSCH. In step 1217, NE 1220 may transmit at least one indication to UE 1230 indicating the identified at least one uplink transmission beam exceeding at least one predefined quality threshold. In step 1219, UE 1230 may transmit at least one subsequent transmission, such as MsgC, using the identified at least one uplink transmission beam exceeding at least one predefined quality threshold.

Figure 13:
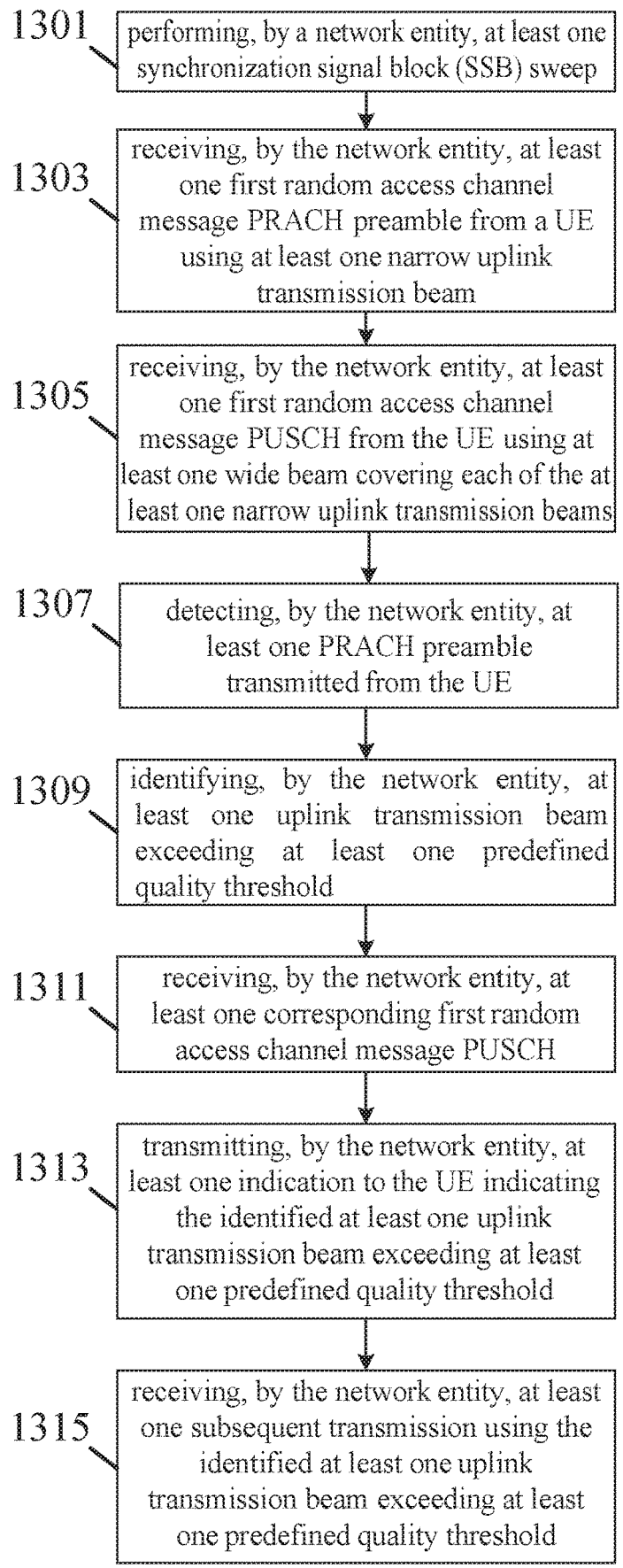
FIG. 13 illustrates an example of a method performed by a network entity according to certain example embodiments.

FIG. 13 illustrates an example of a method performed by a NE, such as NE 1510 in FIG. 15. In step 1301, the NE may perform at least one synchronization signal block (SSB) sweep, which may be received by a UE, such as UE 1520 in FIG. 15. In step 1303, the NE may receive at least one first random access channel message, such as MsgA, PRACH preamble from the UE using at least one narrow uplink transmission beam. In step 1305, the NE may receive at least one first random access channel message, such as MsgA, PUSCH from the UE using at least one wide beam covering each of the at least one narrow uplink transmission beams. In step 1307, the NE may detect at least one PRACH preamble transmitted from the UE. In step 1309, the NE may identify at least one uplink transmission beam exceeding at least one predefined quality threshold. In step 1311, the NE may receive at least one corresponding first random access channel message PUSCH. In step 1313, the NE may transmit at least one indication to the UE indicating the identified at least one uplink transmission beam exceeding at least one predefined quality threshold. In step 1315, the NE may receive at least one subsequent transmission, such as MsgC, using the identified at least one uplink transmission beam exceeding at least one predefined quality threshold.

Figure 14:
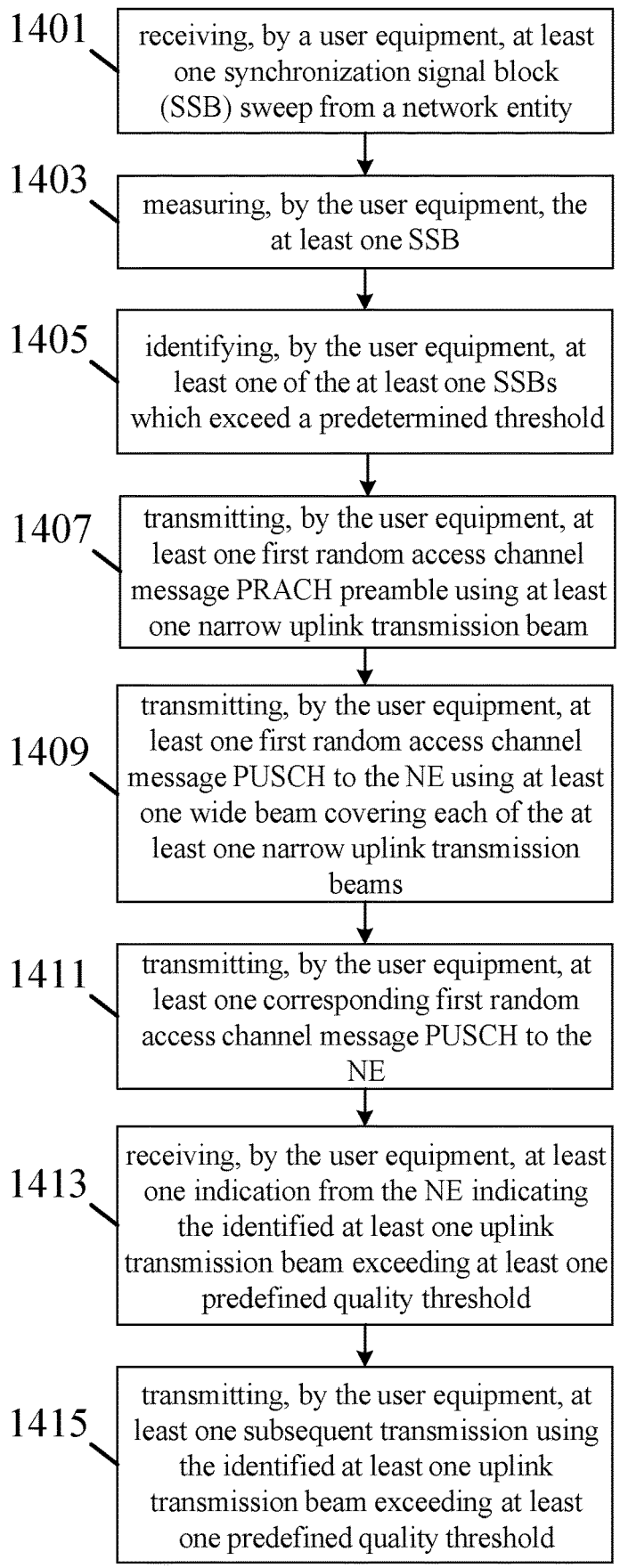
FIG. 14 illustrates an example of a method performed by a user equipment according to certain example embodiments.

FIG. 14 illustrates an example of a method performed by a UE, such as UE 1520 in FIG. 15. In step 1401, the UE may receive at least one synchronization signal block (SSB) sweep from a NE, such as NE 1510 in FIG. 15. In step 1403, the UE may measure the at least one SSB. In step 1405, the UE may identify at least one of the at least one SSBs which exceed a predetermined threshold. In step 1407, the UE may transmit at least one first random access channel message, such as MsgA, PRACH preamble using at least one narrow uplink transmission beam. The at least one narrow uplink transmission beam may be in the direction of the received at least one SSB from the NE. In step 1409, the UE may transmit at least one first random access channel message, such as MsgA, PUSCH to the NE using at least one wide beam covering each of the at least one narrow uplink transmission beams.

In step 1411, the UE may transmit at least one corresponding first random access channel message PUSCH to the NE. In step 1413, the UE may receive at least one indication from the NE indicating the identified at least one uplink transmission beam exceeding at least one predefined quality threshold. In step 1415, the UE may transmit at least one subsequent transmission, such as MsgC, using the identified at least one uplink transmission beam exceeding at least one predefined quality threshold to the NE.

FIG. 15 illustrates an example of a system according to certain embodiments. In one embodiment, a system may include multiple devices, such as, for example, network entity 1510 and/or user equipment 1520.

Network entity 1510 may be one or more of a base station, such as an evolved node B (eNB) or 5G or New Radio node B (gNB), a serving gateway, a server, and/or any other access node or combination thereof. Furthermore, network entity 1510 and/or user equipment 1520 may be one or more of a citizens broadband radio service device (CBSD).

User equipment 1520 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

One or more of these devices may include at least one processor, respectively indicated as 1511 and 1521. Processors 1511 and 1521 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of devices indicated at 1512 and 1522. The memory may be fixed or removable. The memory may include computer program instructions or computer code contained therein. Memories 1512 and 1522 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

Processors 1511 and 1521 and memories 1512 and 1522 or a subset thereof, may be configured to provide means corresponding to the various blocks of FIGS. 1-14. Although not shown, the devices may also include positioning hardware, such as GPS or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 15, transceivers 1513 and 1523 may be provided, and one or more devices may also include at least one antenna, respectively illustrated as 1514 and 1524. The device may have many antennas, such as an array of antennas configured for multiple input multiple output (MIMO) communications, or multiple antennas for multiple radio access technologies. Other configurations of these devices, for example, may be provided. Transceivers 1513 and 1523 may be a transmitter, a receiver, or both a transmitter and a receiver, or a unit or device that may be configured both for transmission and reception.

The memory and the computer program instructions may be configured, with the processor for the particular device, to cause a hardware apparatus such as user equipment to perform any of the processes described below (see, for example, FIGS. 1-14). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 1-14. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

The features, structures, or characteristics of certain example embodiments described throughout this specification may be combined in any suitable manner in one or more example embodiments. For example, the usage of the phrases "certain example embodiments," "some example embodiments," "other example embodiments," or other similar language, throughout this specification refers to the fact that a particular feature, structure, or characteristic described in connection with the example embodiment may be included in at least one example embodiment of the present invention. Thus, appearance of the phrases "in certain example embodiments," "in some example embodiments," "in other example embodiments," or other similar language, throughout this specification does not necessarily refer to the same group of example embodiments, and the described features, structures, or characteristics may be combined in any suitable manner in one or more example embodiments.

One having ordinary skill in the art will readily understand that certain example embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Partial Glossary

3GPP 3rd Generation Partnership Project
5G 5th Generation Wireless System
AP Access Point
BRP Beam Refinement Phase
DL Downlink
DMRS Demodulation Reference Signal
gNB 5G Base Station
GPS Global Positioning System
NE Network Entity
NR New Radio
PRACH Physical Random Access Channel
PUSCH Physical Uplink Shared Channel
RA Random Access
RACH Random Access Channel
RMSI Remaining Minimum System Information
RRC Radio Resource Control
Rx Receiver
SLS Sector Level Sweep
SSB Synchronization Signal Block
SSW Sector Sweep
STA Station
Tx Transmitter
UE User Equipment
UL Uplink
URLLC Ultra-reliable Low Latency Communication

We claim:

1. An apparatus, comprising:
at least one processor, and
at least one memory including computer program code, wherein
the at least one memory and the computer program code are configured to, with the at least one processor, cause the apparatus to:
receive, from a network entity, at least one parameter configuration for a random access channel procedure;
select at least one transmitter beam configuration for transmission of a preamble part and a physical uplink shared channel part of a first random access channel message, wherein a number of transmitter beam configurations for a transmission of a demodulation reference signal (DMRS) part is configured to have a narrower beam width than a transmitter beam configuration for the transmission of the preamble part and the physical uplink shared channel part of the first random access channel message; and
transmit at least one physical uplink shared channel part of the first random access channel message using the at least one transmitter beam configuration for the transmission of the DMRS part configured to have a narrower beam width than the transmitter beam configuration for the transmission of the preamble part and the physical uplink shared channel part of the first random access channel message, and at least one demodulation reference signal using at least a number of selected transmitter beam configurations.

2. The apparatus according to claim 1, wherein the at least one memory and the computer program code are configured to, with the at least one processor, cause the apparatus to transmit the preamble part of the first random access channel message using the at least one transmitter beam configuration.

3. The apparatus according to claim 1, wherein the at least one memory and the computer program code are configured to, with the at least one processor, cause the apparatus to receive, from the network entity, at least one indication based on at least one signal quality measurement in a second random access channel message of the random access channel procedure.

4. The apparatus according to claim 3, wherein the at least one indication is used for at least one subsequent uplink transmission from the apparatus to the network entity.

5. The apparatus according to claim 1, wherein the at least one parameter configuration is a synchronization signal block sweep, informing the apparatus of coverage via a remaining minimum system information or system information block 1 of the at least one parameter configuration of the random access channel procedure.

6. The apparatus according to claim 1, wherein the at least one parameter configuration includes at least one indication of a number of demodulation reference signals that is included in the first random access channel message for beam refinement.

7. The apparatus according to claim 1, wherein the at least one parameter configuration of the random access channel procedure comprises the number of selected transmitter beam configurations for the transmission of the at least one demodulation reference signal of the first random access channel message.

8. The apparatus according to claim 1, wherein the at least one memory and the computer program code are configured to, with the at least one processor, cause the apparatus to transmit the at least one demodulation reference signal on at least one of the at least a number of selected transmitter beam configurations.

9. The apparatus according to claim 1, wherein the at least one demodulation reference signal comprises at least one of uplink transmission beam refinement demodulation reference signal, and the at least one demodulation reference signal comprises demodulation reference signal sequence or demodulation reference signal port scheduled in one or more of back-loaded, mid-loaded, front-loaded, or interleaved.

10. The apparatus of claim 1, wherein the at least one demodulation reference signal is transmitted parallel in frequency domain.

11. A method, comprising:
receiving, by a user equipment, at least one parameter configuration for a random access channel from a network entity;
selecting, by the user equipment, at least one beam configuration for transmission of a preamble part and a physical uplink shared channel part of a first random access channel message, wherein a number of transmitter beam configurations for a transmission of a demodulation reference signal (DMRS) part is configured to have a narrower beam width than a transmitter beam configuration for the transmission of the preamble part and the physical uplink shared channel part of the first random access channel message; and
transmitting, by the user equipment, at least one physical uplink shared channel part of the first random access channel message using the at least one transmitter beam configuration for the transmission of the DMRS part configured to have a narrower beam width than the transmitter beam configuration for the transmission of the preamble part and the physical uplink shared channel part of the first random access channel message, and at least one demodulation reference signal using at least a number of selected transmitter beam configurations.

12. The method according to claim 11, further comprising:
transmitting the preamble part of the first random access channel message using the at least one transmitter beam configuration.

13. The method according to claim 11, further comprising:
receiving, from the network entity, at least one indication based on at least one signal quality measurement in a second random access channel message of the random access channel procedure.

14. The method according to claim 13, wherein the at least one indication is used for at least one subsequent uplink transmission from the user equipment to the network entity.

15. The method according to claim 11, wherein the at least one parameter configuration is a synchronization signal block sweep, informing the user equipment of coverage via a remaining minimum system information or system information block 1 of the at least one parameter configuration of the random access channel procedure.

16. The method according to claim 11, wherein the at least one parameter configuration includes at least one indication of a number of demodulation reference signals that is included in the first random access channel message for beam refinement.

17. The method according to claim 11, wherein the at least one parameter configuration of the random access channel procedure comprises the number of selected transmitter beam configurations for the transmission of the at least one demodulation reference signal of the first random access channel message.

18. The method according to claim 11, further comprising:
transmitting the at least one demodulation reference signal on at least one of the at least a number of selected transmitter beam configurations.

19. The method according to claim 11, wherein the at least one demodulation reference signal comprises at least one of uplink transmission beam refinement demodulation reference signal, and the at least one demodulation reference signal comprises demodulation reference signal sequence or demodulation reference signal port scheduled in one or more of back-loaded, mid-loaded, front-loaded, or interleaved.

* * * * *